US012803498B2

(12) United States Patent
Chen et al.

(10) Patent No.: US 12,803,498 B2
(45) Date of Patent: Nov. 17, 2026

(54) PHOTOVOLTAIC ENERGY STORAGE CONTROL MODULE, PHOTOVOLTAIC ENERGY STORAGE CONTROL METHOD, AND PHOTOVOLTAIC ENERGY STORAGE SYSTEM

(71) Applicant: Huawei Digital Power Technologies Co., Ltd., Shenzhen (CN)

(72) Inventors: Aitang Chen, Shanghai (CN); Zhiwu Xu, Shenzhen (CN); Haibin Guo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 464 days.

(21) Appl. No.: 18/523,408

(22) Filed: Nov. 29, 2023

(65) Prior Publication Data

US 2024/0097616 A1 Mar. 21, 2024

Related U.S. Application Data

(63) Continuation of application No. PCT/CN2022/096029, filed on May 30, 2022.

(30) Foreign Application Priority Data

May 31, 2021 (CN) ......................... 202110604348.1

(51) Int. Cl.
*H02S 40/38* (2014.01)
*H02J 7/35* (2006.01)
*H02S 40/32* (2014.01)

(52) U.S. Cl.
CPC ................ *H02S 40/38* (2014.12); *H02J 7/35* (2013.01); *H02S 40/32* (2014.12)

(58) Field of Classification Search
CPC .. H02S 40/38; H02S 40/32; H02J 7/35; H02J 7/50

(Continued)

(56) References Cited

U.S. PATENT DOCUMENTS

2011/0144822 A1 6/2011 Choi
2016/0315498 A1 10/2016 Narla et al.

(Continued)

FOREIGN PATENT DOCUMENTS

CN 108110747 A 6/2018
CN 111293717 A 6/2020

(Continued)

*Primary Examiner* — Edwyn Labaze
(74) *Attorney, Agent, or Firm* — Slater Matsil, LLP

(57) ABSTRACT

This application provides a photovoltaic energy storage control module and a photovoltaic energy storage control method. A control component included in the photovoltaic energy storage control module can set reference values of bus voltages of a first direct-current converter, a second direct-current converter, and an inverter. Further, the first direct-current converter, the second direct-current converter, and the inverter can automatically adjust a power supply relationship among the first direct-current converter, the second direct-current converter, and the inverter based on a value relationship among the reference values of the bus voltages of the first direct-current converter, the second direct-current converter, and the inverter. In this way, flexibility of the photovoltaic energy storage control module is improved.

20 Claims, 10 Drawing Sheets

(58) Field of Classification Search
USPC ................................ 320/101, 104, 109, 112
See application file for complete search history.

(56) References Cited

U.S. PATENT DOCUMENTS

| | | | | |
|---|---|---|---|---|
| 2020/0144956 | A1* | 5/2020 | Zhang | H02S 10/20 |
| 2020/0169091 | A1* | 5/2020 | Vlasov | H02J 3/32 |
| 2023/0327448 | A1* | 10/2023 | Liu | H02J 3/32<br>307/82 |
| 2025/0167681 | A1* | 5/2025 | Wang | H02M 3/156 |

FOREIGN PATENT DOCUMENTS

| | | | |
|---|---|---|---|
| CN | 112838612 | A | 5/2021 |
| CN | 113489123 | A | 10/2021 |
| EP | 3823152 | A1 | 5/2021 |
| WO | 2020108460 | A1 | 6/2020 |

* cited by examiner

PHOTOVOLTAIC ENERGY STORAGE CONTROL MODULE, PHOTOVOLTAIC ENERGY STORAGE CONTROL METHOD, AND PHOTOVOLTAIC ENERGY STORAGE SYSTEM

CROSS-REFERENCE TO RELATED APPLICATIONS

This application is a continuation of International Application No. PCT/CN2022/096029, filed on May 30, 2022, which claims priority to Chinese Patent Application No. 202110604348.1, filed on May 31, 2021. The disclosures of the aforementioned applications are hereby incorporated by reference in their entireties.

TECHNICAL FIELD

Embodiments of this application relate to the circuit field, and in particular, to a photovoltaic energy storage control module, a photovoltaic energy storage control method, and a photovoltaic energy storage system.

BACKGROUND

With development of photovoltaic technologies, the photovoltaic power generation technology becomes gradually mature, and an installed capacity increases rapidly. A photovoltaic power generation system has problems such as greatly fluctuating output power. If the output power of the photovoltaic power generation system is not processed and directly output to a power grid, a power grid voltage and a power grid frequency fluctuate, which affects stability of the entire power grid.

A photovoltaic energy storage system combining a photovoltaic system and an energy storage system can effectively alleviate fluctuation generated due to the output power. The photovoltaic energy storage system is widely used because of high operating efficiency of the photovoltaic energy storage system. When output energy of the photovoltaic system is excessively large, a scheduling center controls the photovoltaic system to charge the energy storage system, thereby reducing total output power and avoiding energy waste. When energy of the photovoltaic system is insufficient, the scheduling center controls the energy storage system to discharge, to ensure smooth output of total power. In a distributed application scenario, an inverter adjusts output power of the photovoltaic system and output power of the energy storage system according to a communication instruction, so that the inverter can discharge at scheduled power of the power grid after receiving the power output by the photovoltaic system and the power output by the energy storage system.

However, how to properly control a power supply relationship among the photovoltaic system, the energy storage system, and the inverter is an urgent problem to be resolved.

SUMMARY

This application provides a photovoltaic energy storage control module, a photovoltaic energy storage control method, and a photovoltaic energy storage system. A control component included in the photovoltaic energy storage control module may automatically adjust a power supply relationship among a first direct-current converter, a second direct-current converter, and an inverter, to improve flexibility of the photovoltaic energy storage control module.

A first aspect of this application provides a photovoltaic energy storage control module. The photovoltaic energy storage control module includes a control component, a first direct-current converter, a second direct-current converter, and an inverter. A first end of the first direct-current converter is electrically connected to a first end of the second direct-current converter and a first end of the inverter through a first connection point, and a second end of the first direct-current converter is electrically connected to a photovoltaic module. The first end of the second direct-current converter is electrically connected to the first end of the inverter through the first connection point, and a second end of the second direct-current converter is electrically connected to an energy storage battery. A second end of the inverter is electrically connected to a power grid. The control component is configured to set reference values of bus voltages of the first direct-current converter, the second direct-current converter, and the inverter. The first direct-current converter, the second direct-current converter, and the inverter are jointly configured to adjust a power supply relationship among the first direct-current converter, the second direct-current converter, and the inverter based on a value relationship among the reference values of the bus voltages of the first direct-current converter, the second direct-current converter, and the inverter.

In this application, the control component included in the photovoltaic energy storage control module may set the reference values of the bus voltages of the first direct-current converter, the second direct-current converter, and the inverter. Further, the first direct-current converter, the second direct-current converter, and the inverter may automatically adjust the power supply relationship among the first direct-current converter, the second direct-current converter, and the inverter based on the value relationship among the reference values of the bus voltages of the first direct-current converter, the second direct-current converter, and the inverter. In this way, flexibility of the photovoltaic energy storage control module is improved. If scheduled power of the power grid changes rapidly, one of the first direct-current converter, the second direct-current converter, and the inverter performs constant voltage control to control a bus voltage, and the other two devices perform constant current control to control power. The constant voltage control and the constant current control may be automatically switched, to ensure stable power supply among the first direct-current converter, the second direct-current converter, and the inverter.

In a possible implementation of the first aspect, the control component is specifically configured to: set a reference value of a bus voltage of the first direct-current converter to a first value, set a reference value of a bus voltage of the second direct-current converter to a second value, and set a reference value of a bus voltage of the inverter to a third value, where the first value is greater than the second value, and the second value is greater than the third value. The first direct-current converter, the second direct-current converter, and the inverter are jointly specifically configured to adjust, based on the fact that the first value is greater than the second value and the second value is greater than the third value, the first direct-current converter to preferentially output power to the inverter than the second direct-current converter.

In this possible implementation, the control component sets the reference value of the bus voltage of the first direct-current converter to be greater than the reference value of the bus voltage of the second direct-current converter, and sets the reference value of the bus voltage of the second direct-current converter to be greater than the reference value of the bus voltage of the inverter. In this way, the first direct-current converter in the photovoltaic energy storage control module preferentially outputs power to the inverter, and the second direct-current converter supplementally outputs power only when the power output by the first direct-current converter does not meet the scheduled power of the power grid. A manner of preferentially using the photovoltaic module to transmit electricity to the power grid and supplementally using a battery to transmit electricity to the power grid is used, to more properly utilize energy and improve energy utilization efficiency.

In a possible implementation of the first aspect, the control component is specifically configured to: set a reference value of a bus voltage of the first direct-current converter to a fourth value, set a reference value of a bus voltage of the second direct-current converter to a fifth value, and set a reference value of a bus voltage of the inverter to a sixth value, where the fifth value is greater than the fourth value, and the fourth value is greater than the sixth value. The first direct-current converter, the second direct-current converter, and the inverter are jointly specifically configured to adjust, based on the fact that the fifth value is greater than the fourth value and the fourth value is greater than the sixth value, the second direct-current converter to preferentially output power to the inverter than the first direct-current converter.

In this possible implementation, the control component sets the reference value of the bus voltage of the second direct-current converter to be greater than the reference value of the bus voltage of the first direct-current converter, and sets the reference value of the bus voltage of the first direct-current converter to be greater than the reference value of the bus voltage of the inverter. In this way, the second direct-current converter in the photovoltaic energy storage control module preferentially outputs power to the inverter, and the first direct-current converter supplementally outputs power only when the power output by the second direct-current converter does not meet the scheduled power of the power grid. If a voltage output by the photovoltaic module is unstable due to a specific reason, electricity may be transmitted to the power grid in a manner of preferentially using a battery to transmit electricity to the power grid and supplementally using the photovoltaic module to transmit electricity to the power grid. Stability of power output by the photovoltaic energy storage control module is further improved.

In a possible implementation of the first aspect, the control component is specifically configured to: set a reference value of a bus voltage of the first direct-current converter to a seventh value, set a reference value of a bus voltage of the second direct-current converter to an eighth value, and set a reference value of a bus voltage of the inverter to a ninth value, where the seventh value is greater than the ninth value, and the ninth value is greater than the eighth value. The first direct-current converter, the second direct-current converter, and the inverter are jointly specifically configured to adjust, based on the fact that the seventh value is greater than the ninth value and the ninth value is greater than the eighth value, the first direct-current converter to preferentially output power to the second direct-current converter than the inverter.

In this possible implementation, the control component sets the reference value of the bus voltage of the first direct-current converter to be greater than the reference value of the bus voltage of the inverter, and sets the reference value of the bus voltage of the inverter to be greater than the reference value of the bus voltage of the second direct-current converter. In this way, the first direct-current converter in the photovoltaic energy storage control module preferentially outputs power to the second direct-current converter, and the inverter supplementally outputs power only when the power output by the first direct-current converter does not meet maximum charging power of the energy storage battery. A manner of preferentially using the photovoltaic module to charge the energy storage battery and supplementally using the power grid to charge the energy storage battery is used, to more properly utilize energy and improve energy utilization efficiency.

In a possible implementation of the first aspect, the first direct-current converter is further configured to calculate a first voltage, where the first voltage indicates a reference bus voltage required for normal operating of the first direct-current converter. The second direct-current converter is further configured to calculate a second voltage, where the second voltage indicates a reference bus voltage required for normal operating of the second direct-current converter. The inverter is further configured to calculate a third voltage, where the third voltage indicates a reference bus voltage required for normal operating of the inverter. The control component is further configured to: determine a fourth voltage, where the fourth voltage is a largest value of the first voltage, the second voltage, and the third voltage; and add a tenth value, an eleventh value, and a twelfth value to the fourth voltage to obtain the reference values of the bus voltages of the first direct-current converter, the second direct-current converter, and the inverter.

In this possible implementation, the first direct-current converter, the second direct-current converter, and the inverter may calculate the bus reference voltages for respectively meeting working requirements of the first direct-current converter, the second direct-current converter, and the inverter. The first voltage may be obtained through calculation based on a voltage that is input by the photovoltaic module to the first direct-current converter. The second voltage may be obtained through calculation based on an input voltage of the energy storage battery. The third voltage may be obtained through calculation based on a current voltage of the power grid. The control component determines the fourth voltage. The fourth voltage and the tenth value are added to obtain the reference value of the bus voltage of the first direct-current converter. The fourth voltage and the eleventh value are added to obtain the reference value of the bus voltage of the second direct-current converter. The fourth voltage and the twelfth value are added to obtain the reference value of the bus voltage of the inverter. The value relationship among the bus voltages of the first direct-current converter, the second direct-current converter, and the inverter is adjusted by adjusting a value relationship among the tenth value, the eleventh value, and the twelfth value. This possible implementation provides a specific implementation of calculating a bus reference voltage, to improve implementability of the solution.

In a possible implementation of the first aspect, the control component is further configured to receive a first instruction. The first instruction indicates the value relationship among the reference values of the bus voltages of the first direct-current converter, the second direct-current converter, and the inverter. The control component is specifically configured to set the reference values of the bus voltages of the first direct-current converter, the second direct-current converter, and the inverter according to the first instruction.

In this possible implementation, the control component receives the first instruction, and sets the reference values of the bus voltages of the first direct-current converter, the second direct-current converter, and the inverter according to the first instruction, to provide a solution of manually switching an output power priority and improve flexibility of the photovoltaic energy storage control module.

In a possible implementation of the first aspect, the control component includes the first direct-current converter, the second direct-current converter, or the inverter.

In this possible implementation, a specific implementation of the control component is provided, to improve implementability of the solution.

In a possible implementation of the first aspect, the control component is a device independent of the first direct-current converter, the second direct-current converter, and the inverter. The control component is electrically connected to the first direct-current converter, the second direct-current converter, and the inverter through the first connection point.

In this possible implementation, a specific implementation of the control component is provided, to improve implementability of the solution.

A second aspect of this application provides a photovoltaic energy storage control method. The photovoltaic energy storage control method is applied to a photovoltaic energy storage control module. The photovoltaic energy storage control module includes a control component, a first direct-current converter, a second direct-current converter, and an inverter. A first end of the first direct-current converter is electrically connected to a first end of the second direct-current converter and a first end of the inverter through a first connection point, and a second end of the first direct-current converter is electrically connected to a photovoltaic module. The first end of the second direct-current converter is electrically connected to the first end of the inverter through the first connection point, and a second end of the second direct-current converter is electrically connected to an energy storage battery. A second end of the inverter is electrically connected to a power grid. The method includes: The control component sets reference values of bus voltages of the first direct-current converter, the second direct-current converter, and the inverter; and adjusts a power supply relationship among the first direct-current converter, the second direct-current converter, and the inverter based on a value relationship among the reference values of the bus voltages of the first direct-current converter, the second direct-current converter, and the inverter.

In this application, the control component included in the photovoltaic energy storage control module may set the reference values of the bus voltages of the first direct-current converter, the second direct-current converter, and the inverter. Further, the first direct-current converter, the second direct-current converter, and the inverter may automatically adjust the power supply relationship among the first direct-current converter, the second direct-current converter, and the inverter based on the value relationship among the reference values of the bus voltages of the first direct-current converter, the second direct-current converter, and the inverter. In this way, flexibility of the photovoltaic energy storage control module is improved. If scheduled power of the power grid changes rapidly, one of the first direct-current converter, the second direct-current converter, and the inverter performs constant voltage control to control a bus voltage, and the other two devices perform constant current control to control power. The constant voltage control and the constant current control may be automatically switched, to ensure stable power supply among the first direct-current converter, the second direct-current converter, and the inverter.

In a possible implementation of the second aspect, the control component is specifically configured to: set a reference value of a bus voltage of the first direct-current converter to a first value, set a reference value of a bus voltage of the second direct-current converter to a second value, and set a reference value of a bus voltage of the inverter to a third value, where the first value is greater than the second value, and the second value is greater than the third value. The first direct-current converter, the second direct-current converter, and the inverter are jointly specifically configured to adjust, based on the fact that the first value is greater than the second value and the second value is greater than the third value, the first direct-current converter to preferentially output power to the inverter than the second direct-current converter.

In this possible implementation, the control component sets the reference value of the bus voltage of the first direct-current converter to be greater than the reference value of the bus voltage of the second direct-current converter, and sets the reference value of the bus voltage of the second direct-current converter to be greater than the reference value of the bus voltage of the inverter. In this way, the first direct-current converter in the photovoltaic energy storage control module preferentially outputs power to the inverter, and the second direct-current converter supplementally outputs power only when the power output by the first direct-current converter does not meet the scheduled power of the power grid. A manner of preferentially using the photovoltaic module to transmit electricity to the power grid and supplementally using a battery to transmit electricity to the power grid is used, to more properly utilize energy and improve energy utilization efficiency.

In a possible implementation of the second aspect, that the control component sets reference values of bus voltages of the first direct-current converter, the second direct-current converter, and the inverter includes that the control component sets a reference value of a bus voltage of the first direct-current converter to a fourth value, sets a reference value of a bus voltage of the second direct-current converter to a fifth value, and sets a reference value of a bus voltage of the inverter to a sixth value, where the fifth value is greater than the fourth value, and the fourth value is greater than the sixth value. The adjusting a power supply relationship among the first direct-current converter, the second direct-current converter, and the inverter based on a value relationship among the reference values of the bus voltages of the first direct-current converter, the second direct-current converter, and the inverter includes: adjusting, based on the fact that the fifth value is greater than the fourth value and the fourth value is greater than the sixth value, the first direct-current converter to preferentially output power to the inverter than the second direct-current converter.

In this possible implementation, the control component sets the reference value of the bus voltage of the second direct-current converter to be greater than the reference value of the bus voltage of the first direct-current converter, and sets the reference value of the bus voltage of the first direct-current converter to be greater than the reference value of the bus voltage of the inverter. In this way, the second direct-current converter in the photovoltaic energy storage control module preferentially outputs power to the inverter, and the first direct-current converter supplementally outputs power only when the power output by the second direct-current converter does not meet the scheduled power of the power grid. If a voltage output by the photovoltaic module is unstable due to a specific reason, electricity may be transmitted to the power grid in a manner of preferentially using a battery to transmit electricity to the power grid and supplementally using the photovoltaic module to transmit electricity to the power grid. Stability of power output by the photovoltaic energy storage control module is further improved.

In a possible implementation of the second aspect, the method further includes: The control component is specifically configured to: set a reference value of a bus voltage of the first direct-current converter to a seventh value, set a reference value of a bus voltage of the second direct-current converter to an eighth value, and set a reference value of a bus voltage of the inverter to a ninth value, where the seventh value is greater than the ninth value, and the ninth value is greater than the eighth value. The adjusting a power supply relationship among the first direct-current converter, the second direct-current converter, and the inverter based on a value relationship among the reference values of the bus voltages of the first direct-current converter, the second direct-current converter, and the inverter includes: adjusting, based on the fact that the seventh value is greater than the ninth value and the ninth value is greater than the eighth value, the first direct-current converter to preferentially output power to the second direct-current converter than the inverter.

In this possible implementation, the control component sets the reference value of the bus voltage of the first direct-current converter to be greater than the reference value of the bus voltage of the inverter, and sets the reference value of the bus voltage of the inverter to be greater than the reference value of the bus voltage of the second direct-current converter. In this way, the first direct-current converter in the photovoltaic energy storage control module preferentially outputs power to the second direct-current converter, and the inverter supplementally outputs power only when the power output by the first direct-current converter does not meet maximum charging power of the energy storage battery. A manner of preferentially using the photovoltaic module to charge the energy storage battery and supplementally using the power grid to charge the energy storage battery is used, to more properly utilize energy and improve energy utilization efficiency.

In a possible implementation of the second aspect, the method further includes: The first direct-current converter calculates a first voltage. The first voltage indicates a reference bus voltage required for normal operating of the first direct-current converter.

The second direct-current converter calculates a second voltage. The second voltage indicates a reference bus voltage required for normal operating of the second direct-current converter. The inverter calculates a third voltage. The third voltage indicates a reference bus voltage required for normal operating of the inverter. The control component determines a fourth voltage, where the fourth voltage is a largest value of the first voltage, the second voltage, and the third voltage; and adds a tenth value, an eleventh value, and a twelfth value to the fourth voltage to obtain the reference values of the bus voltages of the first direct-current converter, the second direct-current converter, and the inverter.

In this possible implementation, the first direct-current converter, the second direct-current converter, and the inverter may calculate the bus reference voltages for respectively meeting working requirements of the first direct-current converter, the second direct-current converter, and the inverter. The first voltage may be obtained through calculation based on a voltage that is input by the photovoltaic module to the first direct-current converter. The second voltage may be obtained through calculation based on an input voltage of the energy storage battery. The third voltage may be obtained through calculation based on a current voltage of the power grid. The control component determines the fourth voltage. The fourth voltage and the tenth value are added to obtain the reference value of the bus voltage of the first direct-current converter. The fourth voltage and the eleventh value are added to obtain the reference value of the bus voltage of the second direct-current converter. The fourth voltage and the twelfth value are added to obtain the reference value of the bus voltage of the inverter. The value relationship among the bus voltages of the first direct-current converter, the second direct-current converter, and the inverter is adjusted by adjusting a value relationship among the tenth value, the eleventh value, and the twelfth value. This possible implementation provides a specific implementation of calculating a bus reference voltage, to improve implementability of the solution.

In a possible implementation of the second aspect, the method further includes: The control component receives a first instruction. The first instruction indicates a value relationship among the reference values of the bus voltages of the first direct-current converter, the second direct-current converter, and the inverter. The control component sets the reference values of the bus voltages of the first direct-current converter, the second direct-current converter, and the inverter according to the first instruction.

In this possible implementation, the control component receives the first instruction, and sets the reference values of the bus voltages of the first direct-current converter, the second direct-current converter, and the inverter according to the first instruction, to provide a solution of manually switching an output power priority and improve flexibility of the photovoltaic energy storage control module.

In a possible implementation of the second aspect, the control component includes the first direct-current converter, the second direct-current converter, or the inverter.

In a possible implementation of the second aspect, the control component is a device independent of the first direct-current converter, the second direct-current converter, and the inverter. The control component is electrically connected to the first direct-current converter, the second direct-current converter, and the inverter through the first connection point.

A third aspect of this application provides a photovoltaic energy storage system. The photovoltaic energy storage system includes a photovoltaic module, a photovoltaic energy storage control module, and an energy storage battery. The photovoltaic energy storage control module is electrically connected to the photovoltaic module, the energy storage battery, and a power grid. The photovoltaic energy storage control module is the photovoltaic energy storage control module according to any one of the first aspect or the possible implementations of the first aspect.

It can be learned from the foregoing technical solutions that embodiments of this application have the following advantages:

In this application, the control component included in the photovoltaic energy storage control module may set the reference values of the bus voltages of the first direct-current converter, the second direct-current converter, and the inverter. Further, the first direct-current converter, the second direct-current converter, and the inverter may automatically adjust a power supply relationship among the first direct-current converter, the second direct-current converter, and the inverter based on a value relationship among the reference values of the bus voltages of the first direct-current converter, the second direct-current converter, and the inverter. In this way, flexibility of the photovoltaic energy storage control module is improved. If scheduled power of the power grid changes rapidly, one of the first direct-current converter, the second direct-current converter, and the inverter performs constant voltage control to control a bus voltage, and the other two devices perform constant current control to control power. The constant voltage control and the constant current control may be automatically switched, to ensure stable power supply among the first direct-current converter, the second direct-current converter, and the inverter.

DETAILED DESCRIPTION OF ILLUSTRATIVE EMBODIMENTS

Figure 1:
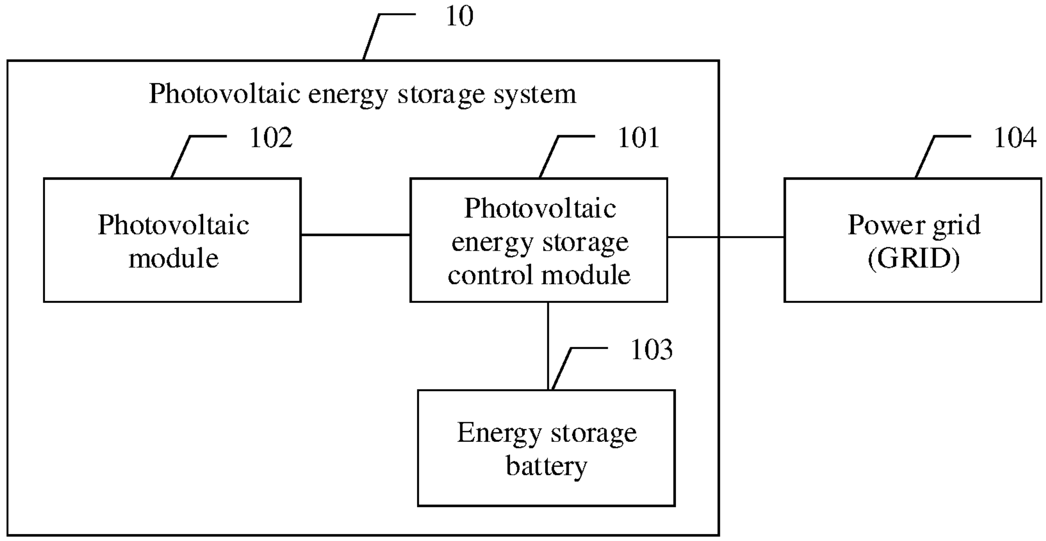
FIG. 1 is a schematic diagram of a structure of a photovoltaic energy storage system according to this application.

The following describes embodiments of this application with reference to the accompanying drawings. A person of ordinary skill in the art may learn that, with development of technologies and emergence of new scenarios, the technical solutions provided in embodiments of this application are also applicable to a similar technical problem.

In the specification, claims, and accompanying drawings of this application, the terms "first", "second", and the like are intended to distinguish similar objects but do not necessarily indicate a specific order or sequence. It should be understood that the data termed in such a way are interchangeable in proper circumstances so that embodiments described herein can be implemented in other orders than the order illustrated or described herein.

In embodiments of this application, the word such as "exemplary" or "for example" represents giving an example, an illustration, or description. Any embodiment or design scheme described by using "example" or "for example" in embodiments of this application should not be construed as being more preferred or advantageous than another embodiment or design scheme. Exactly, use of the term such as "example" or "for example" is intended to present a relative concept in a specific manner for ease of understanding.

The term "and/or" in this application describes only an association relationship of associated objects and represents that three relationships may exist. For example, A and/or B may represent the following three cases: Only A exists, both A and B exist, and only B exists, where A and B may be singular or plural. In addition, in the description of this application, "a plurality of" means two or more than two unless otherwise specified. "At least one of the following items (pieces)" or a similar expression thereof indicates any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

With development of photovoltaic technologies, the photovoltaic power generation technology becomes gradually mature, and an installed capacity increases rapidly. A photovoltaic power generation system has problems such as greatly fluctuating output power. If the output power of the photovoltaic power generation system is not processed and directly output to a power grid, a power grid voltage and a power grid frequency fluctuate, affecting the stability of the entire power grid.

A photovoltaic energy storage system combining a photovoltaic system and an energy storage system can effectively alleviate the fluctuation generated due to the output power. The photovoltaic energy storage system is widely used because of high operating efficiency of the photovoltaic energy storage system. When output energy of the photovoltaic system is excessively large, a scheduling center controls the photovoltaic system to charge the energy storage system, thereby reducing total output power and avoiding energy waste. When energy of the photovoltaic system is insufficient, the scheduling center controls the energy storage system to discharge, to ensure smooth output of total power. In a distributed application scenario, an inverter adjusts output power of the photovoltaic system and output power of the energy storage system by using a communication instruction, so that the inverter can discharge at scheduled power of the power grid after receiving the power output by the photovoltaic system and the power output by the energy storage system.

However, how to properly control a power supply relationship among the photovoltaic system, the energy storage system, and the inverter is an urgent problem to be resolved.

For the problem in the foregoing solution, this application provides a photovoltaic energy storage control module. The photovoltaic energy storage control module can automatically adjust a power supply relationship among a first direct-current converter, a second direct-current converter, and an inverter based on a value relationship among reference values of bus voltages of the first direct-current converter, the second direct-current converter, and the inverter. In this way, flexibility of the photovoltaic energy storage control module is improved. In addition, this application further provides a photovoltaic energy storage control method and a photovoltaic energy storage system that are separately described below.

The following describes the photovoltaic energy storage system provided in this application. FIG. 1 is a schematic diagram of a structure of a photovoltaic energy storage system according to this application.

With reference to FIG. 1, the photovoltaic energy storage system 10 provided in this application includes a photovoltaic energy storage control module 101, a photovoltaic module 102, and an energy storage battery 103.

In this application, in the photovoltaic energy storage system 10, the photovoltaic energy storage control module 101 is electrically connected to the photovoltaic module 102 and the energy storage battery 103. In view of the entire photovoltaic energy storage system 10, the photovoltaic energy storage system 10 is electrically connected to the power grid 104 through the photovoltaic energy storage control module 101. The photovoltaic module 102 converts solar energy into electric energy. The energy storage battery 103 stores the electric energy, and outputs power to the power grid 104 under control of the photovoltaic energy storage control module 101. Optionally, the photovoltaic module 102 may independently output power to the power grid 104 through the photovoltaic energy storage control module 101; the energy storage battery 103 may independently output power to the power grid 104 through the photovoltaic energy storage control module 101; or the photovoltaic module 102 and the energy storage battery 103 may jointly output power to the power grid 104 through the photovoltaic energy storage control module 101. This is not specifically limited herein.

In this application, optionally, the photovoltaic module 102 and the power grid 104 may further output power to the energy storage battery through the photovoltaic energy storage control module 101. Optionally, the photovoltaic module 102 may independently output power to the energy storage battery 103 through the photovoltaic energy storage control module 101; the power grid 104 may independently output power to the energy storage battery 103 through the photovoltaic energy storage control module 101; or the photovoltaic module 102 and the power grid 104 may jointly output power to the energy storage battery 103 through the photovoltaic energy storage control module 101. This is not specifically limited herein.

Based on the photovoltaic energy storage system shown in FIG. 1, the following describes the photovoltaic energy storage control module 101 provided in this application.

In this application, the photovoltaic energy storage control module 101 includes a control component 105, a first direct-current converter 106, a second direct-current converter 107, and an inverter 108.

A first end of the first direct-current converter 106 is electrically connected to a first end of the second direct-current converter 107 and a first end of the inverter through a first connection point, and a second end of the first direct-current converter 106 is electrically connected to the photovoltaic module 102. The first end of the second direct-current converter 107 is electrically connected to the first end of the inverter 108 through the first connection point, and a second end of the second direct-current converter 107 is electrically connected to the energy storage battery 103. A second end of the inverter 108 is electrically connected to the power grid 104.

Figure 2:
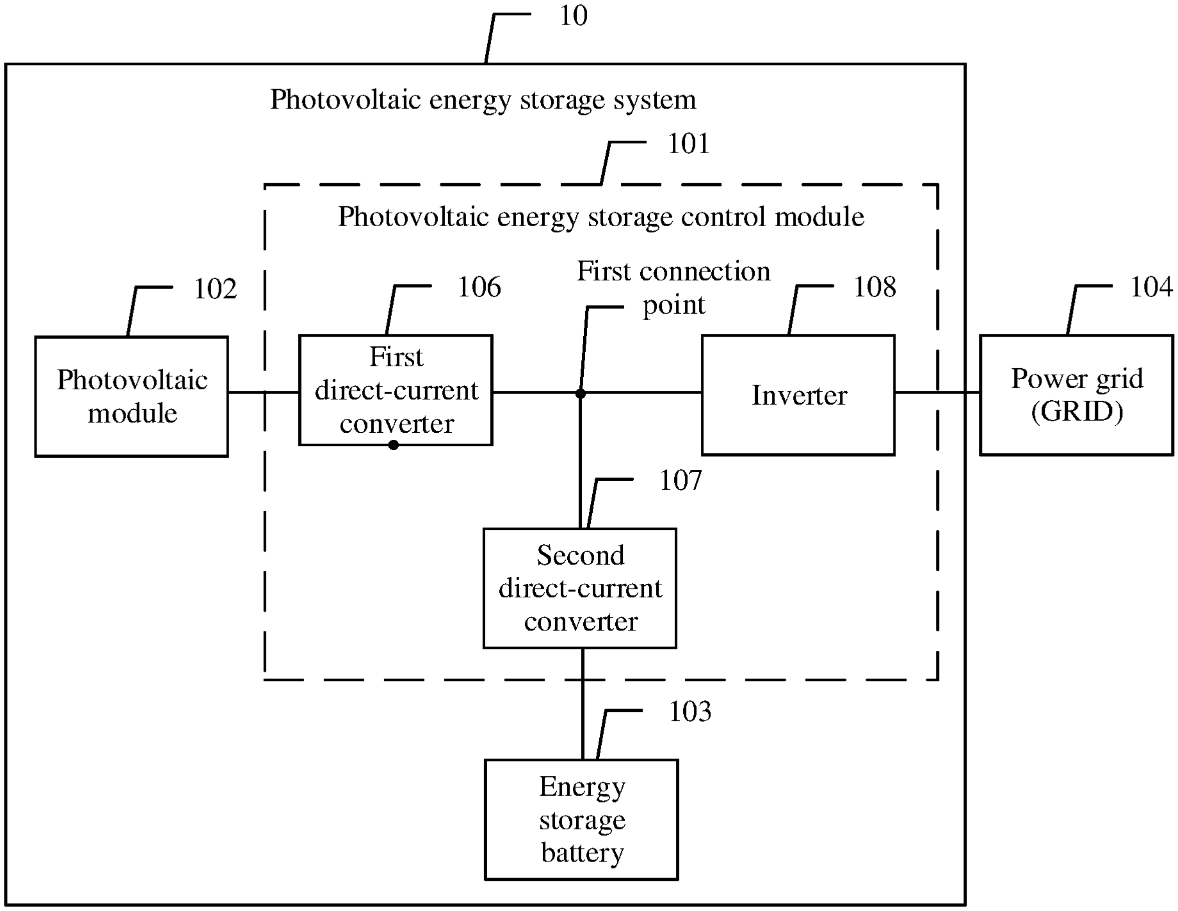
FIG. 2 is a schematic diagram of a structure of a photovoltaic energy storage control module according to this application.

In this application, optionally, the control component 105 may be the first direct-current converter 106, the control component 105 may be the second direct-current converter 107, or the control component 105 may be the inverter 108. If the control component 105 is any one of the first direct-current converter 106, the second direct-current converter 107, and the inverter 108, a connection manner inside the photovoltaic energy storage control module is shown in FIG. 2.

Figure 3:
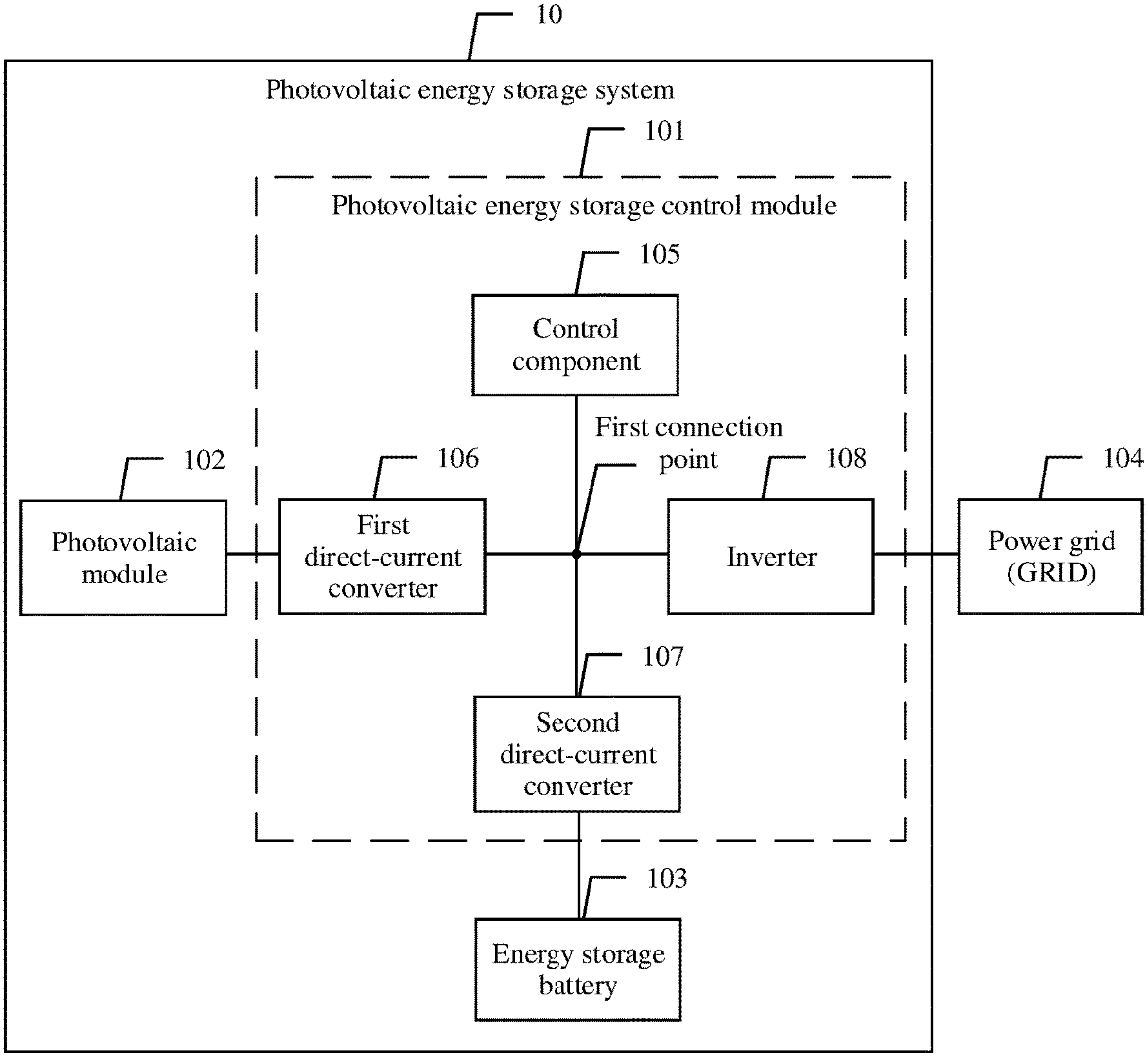
FIG. 3 is another schematic diagram of a structure of a photovoltaic energy storage control module according to this application.

In this application, optionally, the control component 105 may be alternatively a device independent of the first direct-current converter 106, the second direct-current converter 107, and the inverter 108. This is not specifically limited herein. If the control component 105 is an independent device, a connection manner inside the photovoltaic energy storage control module is shown in FIG. 3.

In this application, optionally, the first direct-current converter 106, the second direct-current converter 107, and the inverter 108 may be integrated into one device; the first direct-current converter 106 and the inverter 108 may be integrated into one device, and the second direct-current converter 107 is an independent device; or the second direct-current converter 107 and the inverter 108 may be integrated into one device, and the first direct-current converter 106 is an independent device. This is not specifically limited herein.

In this application, optionally, a maximum power point tracking (MPPT) algorithm may be applied to the first direct-current converter, or an MPPT algorithm may not be applied to the first direct-current converter. This is not specifically limited herein.

In this application, optionally, when setting reference values of bus voltages of the first direct-current converter, the second direct-current converter, and the inverter, the control component may set the reference values of the bus voltages by setting reference values of bus voltage loops, or may set the reference values of the bus voltages in another manner. This is not specifically limited herein.

The foregoing embodiment describes a specific structure of the photovoltaic energy storage control module provided in this application. The following describes a control loop of the first direct-current converter, the second direct-current converter, and the inverter that are included in the photovoltaic energy storage control module provided in this application.

In this application, an outer loop of the first direct-current converter includes an input voltage loop and a bus voltage loop. A loop with a smaller value in the two loops is taken when the two loops compete with each other. An inner loop is a current loop. An outer loop of the second direct-current converter includes a power control loop and a bus voltage loop. The power control loop is briefly referred to as a power loop. The power loop receives a BMS instruction for current limitation, and includes a charging power loop and a discharging power loop. A loop with a larger value in the charging power loop and the bus voltage loop is taken when the charging power loop and the bus voltage loop compete with each other. A loop with a smaller value in the discharging power loop and the bus voltage loop is taken when the discharging power loop and the bus voltage loop compete with each other. An inner loop is a current loop. An outer loop of the inverter includes a power loop and a bus voltage loop. The power loop receives a power scheduling instruction of the power grid, and includes a discharging power loop and a charging power loop. A loop with a smaller value in the discharging power loop and the bus voltage loop is taken when the discharging power loop and the bus voltage loop compete with each other. A loop with a larger value in the charging power loop and the bus voltage loop is taken when the charging power loop and the bus voltage loop compete with each other. An inner loop is a current loop.

The foregoing embodiment describes the control loop of the photovoltaic energy storage control module provided in this application. The following describes a working principle of the photovoltaic energy storage control module provided in this application.

In this application, power output by the first direct-current converter 106 to the inverter 108 or the second direct-current converter 107 is generated by the photovoltaic module 102. The first direct-current converter 106 may control a magnitude of output power of the photovoltaic module 102. When the first direct-current converter 106 works at a first direct-current converter point, the first direct-current converter 106 controls the photovoltaic module 102 to output maximum power. In this case, power output by the first direct-current converter 106 also reaches a maximum value. Similarly, power output by the second direct-current converter 107 to the inverter 108 is generated by the energy storage battery 103. The second direct-current converter 107 may control a magnitude of output power of the energy storage battery 103. In addition, the second direct-current converter 107 may further receive power output by the first direct-current converter 106 and/or the inverter 108 to charge the energy storage battery 103.

In this application, the control component 105 may set reference values of bus voltages of the first direct-current converter 106, the second direct-current converter 107, and the inverter 108. Therefore, the first direct-current converter 106, the second direct-current converter 107, and the inverter 108 may adjust a power supply relationship among the first direct-current converter 106, the second direct-current converter 107, and the inverter 108 based on a value relationship among the reference values of the bus voltages of the first direct-current converter 106, the second direct-current converter 107, and the inverter 108. Optionally, the power supply relationship among the first direct-current converter 106, the second direct-current converter 107, and the inverter 108 may be that the first direct-current converter 106 and/or the second direct-current converter output/outputs power to the inverter 108; or the power supply relationship among the first direct-current converter 106, the second direct-current converter 107, and the inverter 108 may be that the first direct-current converter 106 and/or the inverter 108 output/outputs power to the second direct-current converter 107, or may be another type of power supply relationship. This is not specifically limited herein.

In this application, the control component included in the photovoltaic energy storage control module may set the reference values of the bus voltages of the first direct-current converter, the second direct-current converter, and the inverter. Further, because the reference values of the bus voltages of the first direct-current converter, the second direct-current converter, and the inverter are different, when scheduled power of the power grid changes, one of the first direct-current converter, the second direct-current converter, and the inverter controls the bus voltage to perform constant voltage control, and the other two devices perform constant current control to control power. The constant voltage control and the constant current control may be automatically switched. The first direct-current converter, the second direct-current converter, and the inverter may automatically adjust, based on the value relationship among the reference values of the bus voltages, values of power output by the first direct-current converter and the second direct-current converter to the inverter, to ensure that the photovoltaic energy storage control module can output smooth and stable power to the power grid. In addition, priorities of outputting power by the first direct-current converter and the second direct-current converter to the inverter are adjusted based on a value relationship among the reference values of the bus voltages of the first direct-current converter and the second direct-current converter. When the first direct-current converter has a higher output priority, the first direct-current converter preferentially outputs power to the inverter, and the second direct-current converter supplementally outputs power. When the second direct-current converter has a higher output priority, the second direct-current converter preferentially outputs power to the inverter, and the first direct-current converter supplementally outputs power to the inverter. This further improves flexibility of outputting power by the photovoltaic energy storage control module to the power grid.

In this application, the control component may control the power supply relationship among the first direct-current converter, the second direct-current converter, and the inverter. A specific implementation is specifically described in the following embodiments.

Scenario 1: The first direct-current converter preferentially outputs power to the inverter.

The control component sets a reference value of a bus voltage of the first direct-current converter to a first value, sets a reference value of a bus voltage of the second direct-current converter to a second value, and sets a reference value of a bus voltage of the inverter to a third value. The first value is greater than the second value, and the second value is greater than the third value.

The first direct-current converter, the second direct-current converter, and the inverter may adjust, based on the fact that the first value is greater than the second value and the second value is greater than the third value, the first direct-current converter to preferentially output power to the inverter than the second direct-current converter.

In the following embodiments, the following example is used to describe the photovoltaic energy storage control module provided in this application: The control component sets bus voltage values of the first direct-current converter, the second direct-current converter, and the inverter by setting the reference values of the bus voltage loops of the first direct-current converter, the second direct-current converter, and the inverter.

In this application, it is assumed that Ppv is maximum photovoltaic discharging power, that is, maximum power output by the first direct-current converter to the first connection point; Pbatch is maximum charging power allowed by the battery, that is, maximum power input to the second direct-current converter; Pbatdisch is maximum discharging power of the battery, that is, maximum power output by the second direct-current converter to the first connection point; Pinvch is charging power output by the inverter from the power grid, and Pinvdisch is discharging power of a photovoltaic energy storage control system to the power grid; and Power A is the scheduled power of the power grid.

In this application, compared with the second direct-current converter, the first direct-current converter preferentially outputs power to the inverter (that is, the first direct-current converter preferentially discharges, and the second direct-current converter supplementally discharges when energy of the first direct-current converter is insufficient). In this scenario, the reference value of the bus voltage loop of the first direct-current converter>the reference value of the bus voltage loop of the second direct-current converter>the reference value of the bus voltage loop of the inverter. This scenario further includes a plurality of different cases. The following separately describes these different cases.

Case 1: Power A >(Ppv+Pbatdisch).

Figure 4:
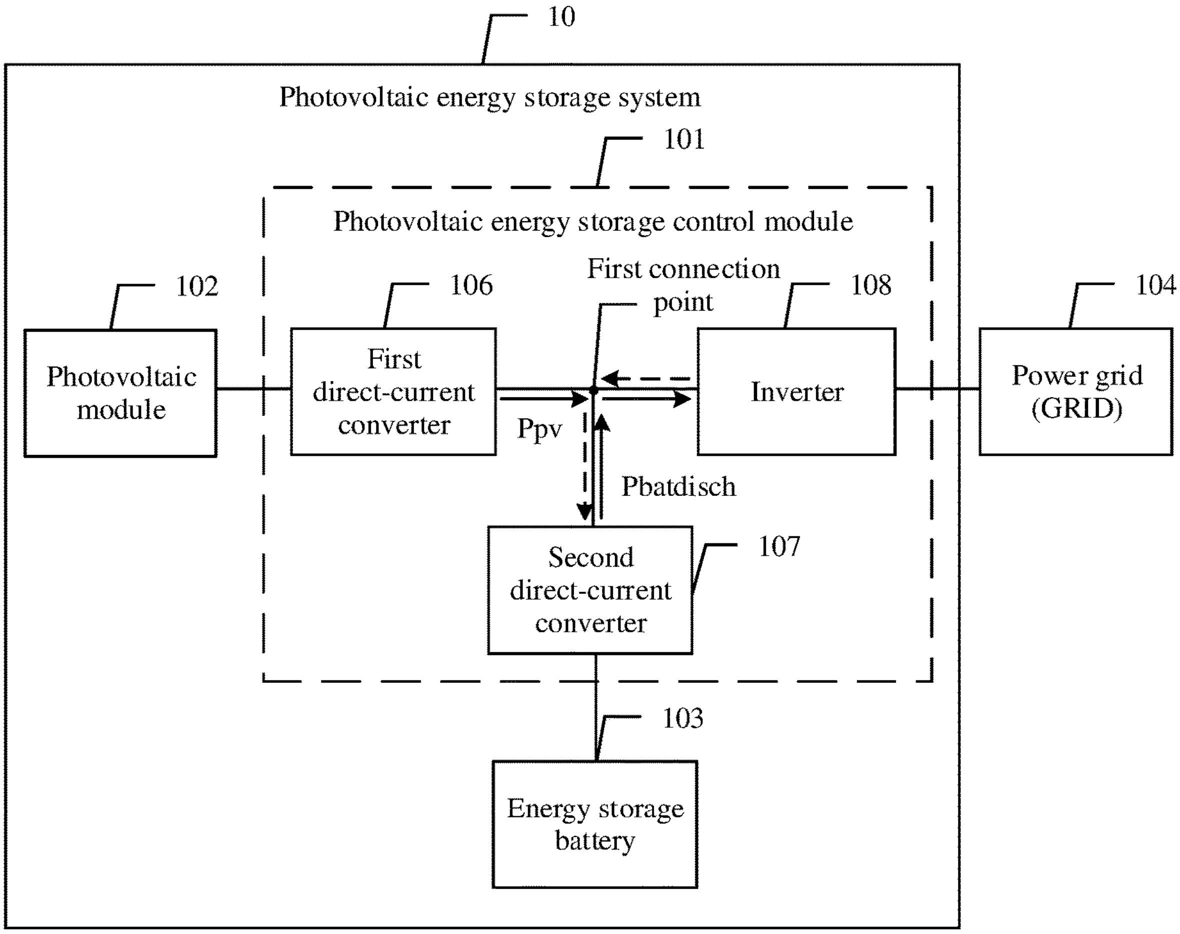
FIG. 4 is a schematic diagram of application of a photovoltaic energy storage control module according to this application.

FIG. 4 is a schematic diagram of application of a photovoltaic energy storage control module according to this application.

With reference to FIG. 4, in this case, the scheduled power of the power grid cannot be met even if the first direct-current converter and the second direct-current converter each output the maximum power, and the photovoltaic energy storage control system can only output maximum power as much as possible to meet a scheduling requirement of the power grid. The bus voltage loop of the inverter works, and the inverter performs constant voltage control to control a bus voltage of the photovoltaic energy storage control module. The bus voltage loop of the first direct-current converter is saturated, and fails in competing with the input voltage loop. The first direct-current converter works at the first direct-current converter point, and performs constant current control to control the first direct-current converter to output the maximum power (Ppv). The bus voltage loop of the second direct-current converter is saturated, and fails in competing with the power loop. The second direct-current converter performs constant current control to output power at the maximum allowed discharging power (Pbatdisch).

Case 2: (Ppv+Pbatdisch)>Power A >Max(Ppv, Pbatdisch).

Figure 5:
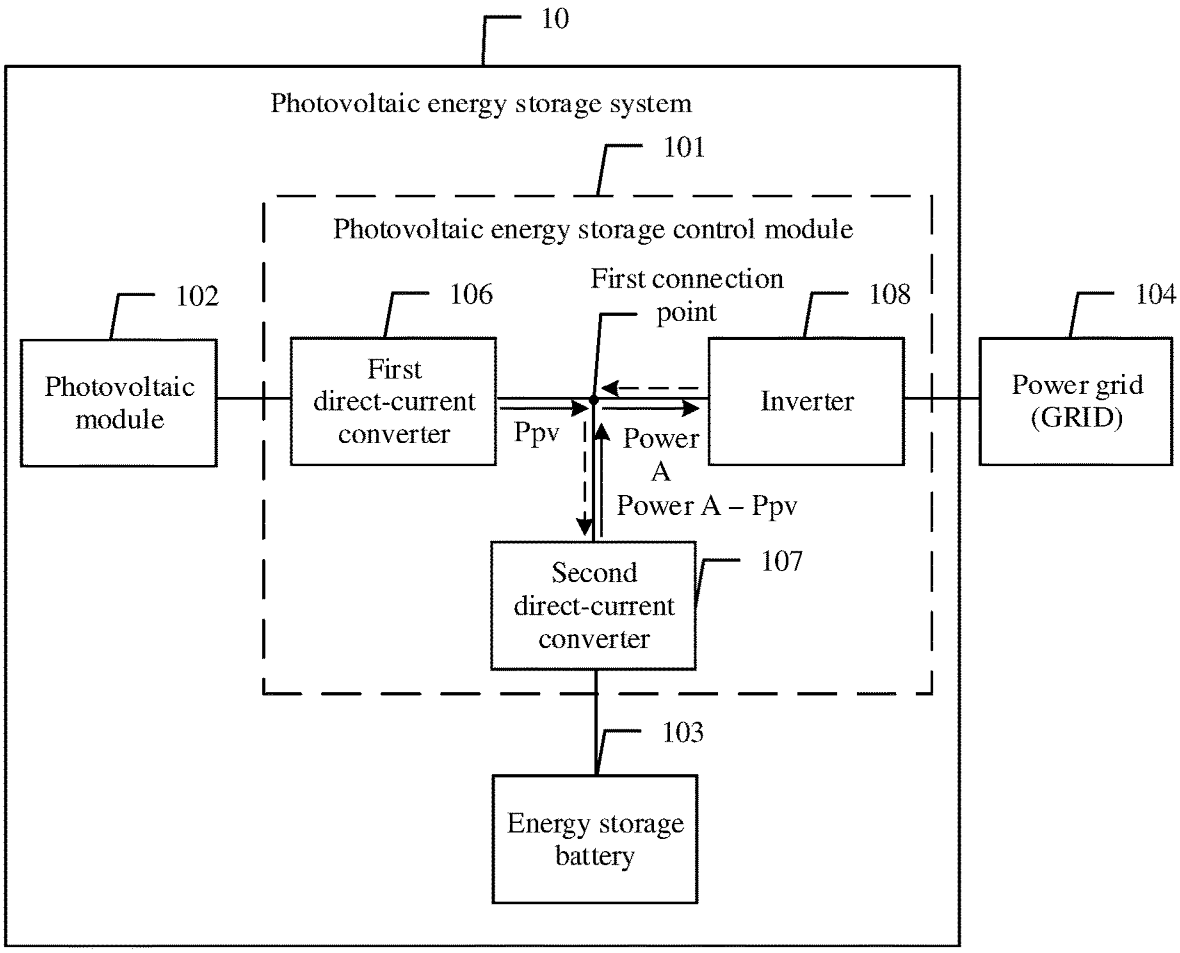
FIG. 5 is another schematic diagram of application of a photovoltaic energy storage control module according to this application.

FIG. 5 is a schematic diagram of application of a photovoltaic energy storage control module according to this application.

With reference to FIG. 5, in this case, power output by each of the first direct-current converter and the second direct-current converter is less than the scheduled power of the power grid, and cannot meet a requirement of the power grid. Therefore, the photovoltaic energy storage control module needs to preferentially output power to the inverter by using the first direct-current converter, and provide an insufficient power part by using the second direct-current converter. The bus voltage loop of the inverter is saturated, and fails in competing with the power loop. The inverter performs constant current control based on the scheduled power of the power grid, to control the photovoltaic energy storage control module to output the scheduled power of the power grid to the power grid. The bus voltage loop of the first direct-current converter is saturated, and fails in competing with the input voltage loop. The first direct-current converter works at the first direct-current converter point, and the first direct-current converter performs constant current control to output the maximum power (Ppv). The bus voltage loop of the second direct-current converter works, and succeeds in competing with the power loop. The second direct-current converter controls the bus voltage to perform constant voltage control. A magnitude of the power output by the second direct-current converter is determined by the inverter and the first direct-current converter.

Case 3: Ppv>Power A >Pbatdisch.

Figure 6:
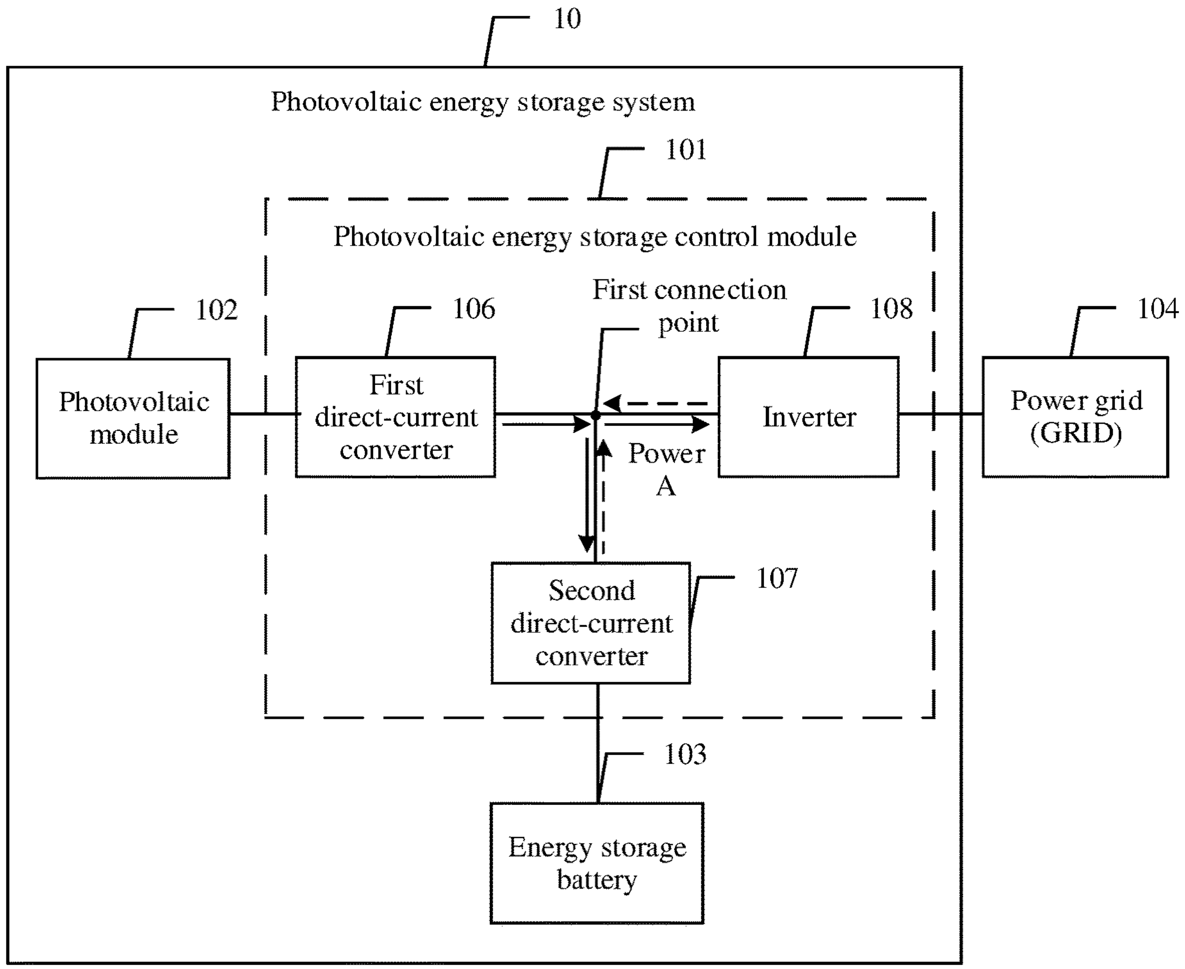
FIG. 6 is another schematic diagram of application of a photovoltaic energy storage control module according to this application.

FIG. 6 is a schematic diagram of application of a photovoltaic energy storage control module according to this application.

With reference to FIG. 6, in this case, the maximum power Ppv output by the first direct-current converter is greater than the scheduled power of the power grid, and can meet a requirement of the power grid. Therefore, the photovoltaic energy storage control module needs to output power to the inverter by using the first direct-current converter, and the second direct-current converter does not need to output power. The bus voltage loop of the inverter is saturated, and fails in competing with the power loop. The inverter performs constant current control to ensure that the photovoltaic energy storage control module outputs the scheduled power of the power grid. When remaining power (Ppv-Power A) of the first direct-current converter is less than the maximum allowed charging power Pinvch of the second direct-current converter, the bus voltage loop of the first direct-current converter is saturated, and fails in competing with the input voltage loop. The first direct-current converter works at the first direct-current converter point, and performs constant current control to output the maximum power Ppv. In this case, the bus voltage loop of the second direct-current converter works, and succeeds in competing with the power loop. The second direct-current converter controls the bus voltage to perform constant voltage control. When remaining power of the first direct-current converter is greater than the maximum allowed charging power Pinvch of the second direct-current converter, the bus voltage loop of the first direct-current converter works, and succeeds in competing with the input voltage loop. The first direct-current converter controls the bus voltage to perform constant voltage control. In this case, the second direct-current converter performs constant current control, so that the second direct-current converter can charge the energy storage battery at the power Pinvch.

Case 4: Pbatdisch >Power A >Ppv.

In this case, a power output case is similar to that shown in FIG. 5. Refer to FIG. 5. The maximum power Ppv output by the first direct-current converter is less than the scheduled power of the power grid (Power A), and the power output by the first direct-current converter alone cannot meet a requirement of the power grid. Therefore, the photovoltaic energy storage control module needs to output power to the inverter by using the first direct-current converter and the second direct-current converter. The bus voltage loop of the inverter is saturated, and fails in competing with the power loop. The inverter performs constant current control to ensure that the photovoltaic energy storage control module outputs the scheduled power of the power grid. The bus voltage loop of the first direct-current converter is saturated, and fails in competing with the input voltage loop. The first direct-current converter works at the first direct-current converter point, and performs constant current control to output the maximum power Ppv. The bus voltage loop of the second direct-current converter works, and succeeds in competing with the power loop. The second direct-current converter controls the bus voltage to perform constant voltage control. A magnitude of the power output by the second direct-current converter is determined by the inverter and the first direct-current converter.

Case 5: Pbatdisch >Ppv>Power A.

Figure 7:
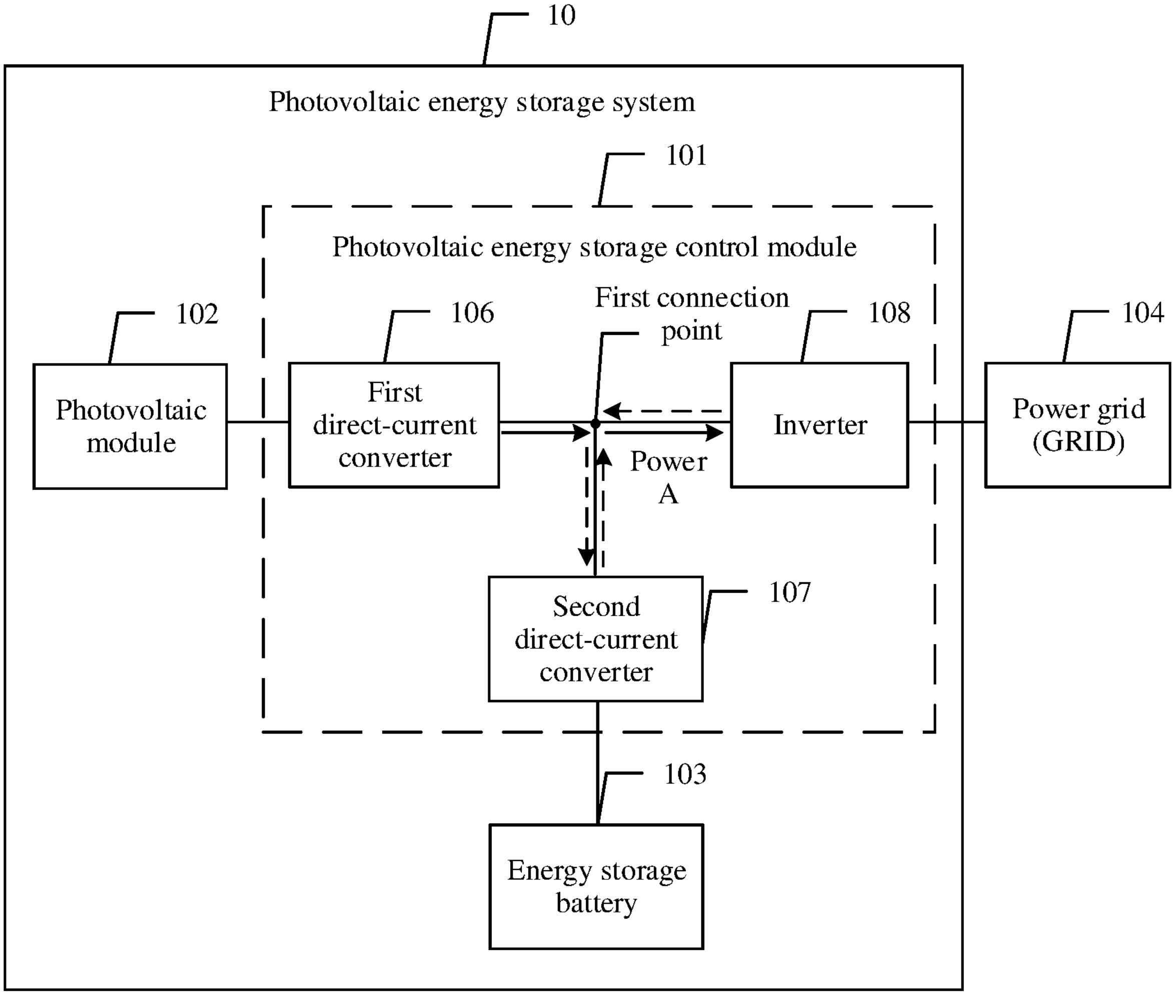
FIG. 7 is another schematic diagram of application of a photovoltaic energy storage control module according to this application.

FIG. 7 is a schematic diagram of application of a photovoltaic energy storage control module according to this application.

With reference to FIG. 7, in this case, the maximum power Ppv output by the first direct-current converter is greater than the scheduled power of the power grid, and can meet a requirement of the power grid. Therefore, the photovoltaic energy storage control module needs to output power to the inverter by using the first direct-current converter, and the second direct-current converter does not need to output power. The bus voltage loop of the inverter is saturated, and fails in competing with the power loop. The inverter performs constant current control based on the scheduled power of the power grid. The bus voltage loop of the first direct-current converter works, and succeeds in competing with the input voltage loop. The first direct-current converter controls the bus voltage to perform constant voltage control. The power output by the second direct-current converter is close to zero.

The foregoing embodiment describes a plurality of different cases included in Scenario 1 in which the first direct-current converter preferentially outputs power to the inverter. The following describes a plurality of different cases included in Scenario 2 in which the second direct-current converter preferentially outputs power to the inverter.

Scenario 2: The second direct-current converter preferentially outputs power to the inverter.

In this application, optionally, the control component may alternatively set a reference value of a bus voltage of the first direct-current converter to a fourth value, set a reference value of a bus voltage of the second direct-current converter to a fifth value, and set a reference value of a bus voltage of the inverter to a sixth value. The fifth value is greater than the fourth value, and the fourth value is greater than the sixth value.

The first direct-current converter, the second direct-current converter, and the inverter may adjust, based on the fact that the fifth value is greater than the fourth value and the fourth value is greater than the sixth value, the second direct-current converter to preferentially output power to the inverter than the first direct-current converter.

In this application, it is assumed that Ppv is maximum photovoltaic discharging power, that is, maximum power output by the first direct-current converter to the first connection point; Pbatch is maximum charging power allowed by the battery, that is, maximum power input to the second direct-current converter; Pbatdisch is maximum discharging power of the battery, that is, maximum power output by the second direct-current converter to the first connection point; Pinvch is charging power output by the inverter from the power grid, and Pinvdisch is discharging power of a photovoltaic energy storage control system to the power grid; and Power A is the scheduled power of the power grid.

In this application, compared with the first direct-current converter, the second direct-current converter preferentially outputs power to the inverter (that is, the second direct-current converter preferentially discharges, and the first direct-current converter supplementally discharges when energy of the second direct-current converter is insufficient). In this scenario, the reference value of the bus voltage loop of the second direct-current converter>the reference value of the bus voltage loop of the first direct-current converter>the reference value of the bus voltage loop of the inverter. This scenario further includes a plurality of different cases. The following separately describes these different cases.

Case 1: Power A >(Ppv+Pbatdisch).

In this case, a power output case is similar to that shown in FIG. 4. Refer to FIG. 4. The scheduled power of the power grid cannot be met even if the first direct-current converter and the second direct-current converter each output the maximum power, and the photovoltaic energy storage control system can only output maximum power as much as possible to meet a scheduling requirement of the power grid. The bus voltage loop of the inverter works, and the inverter performs constant voltage control to control a bus voltage of the photovoltaic energy storage control module. The bus voltage loop of the first direct-current converter is saturated, and fails in competing with the input voltage loop. The first direct-current converter works at the first direct-current converter point, and performs constant current control to control the first direct-current converter to output the maximum power (Ppv). The bus voltage loop of the second direct-current converter is saturated, and fails in competing with the power loop. The second direct-current converter performs constant current control to output the maximum power (Pbatdisch).

Case 2: (Ppv+Pbatdisch)>Power A >Max(Ppv, Pbatdisch).

Figure 8:
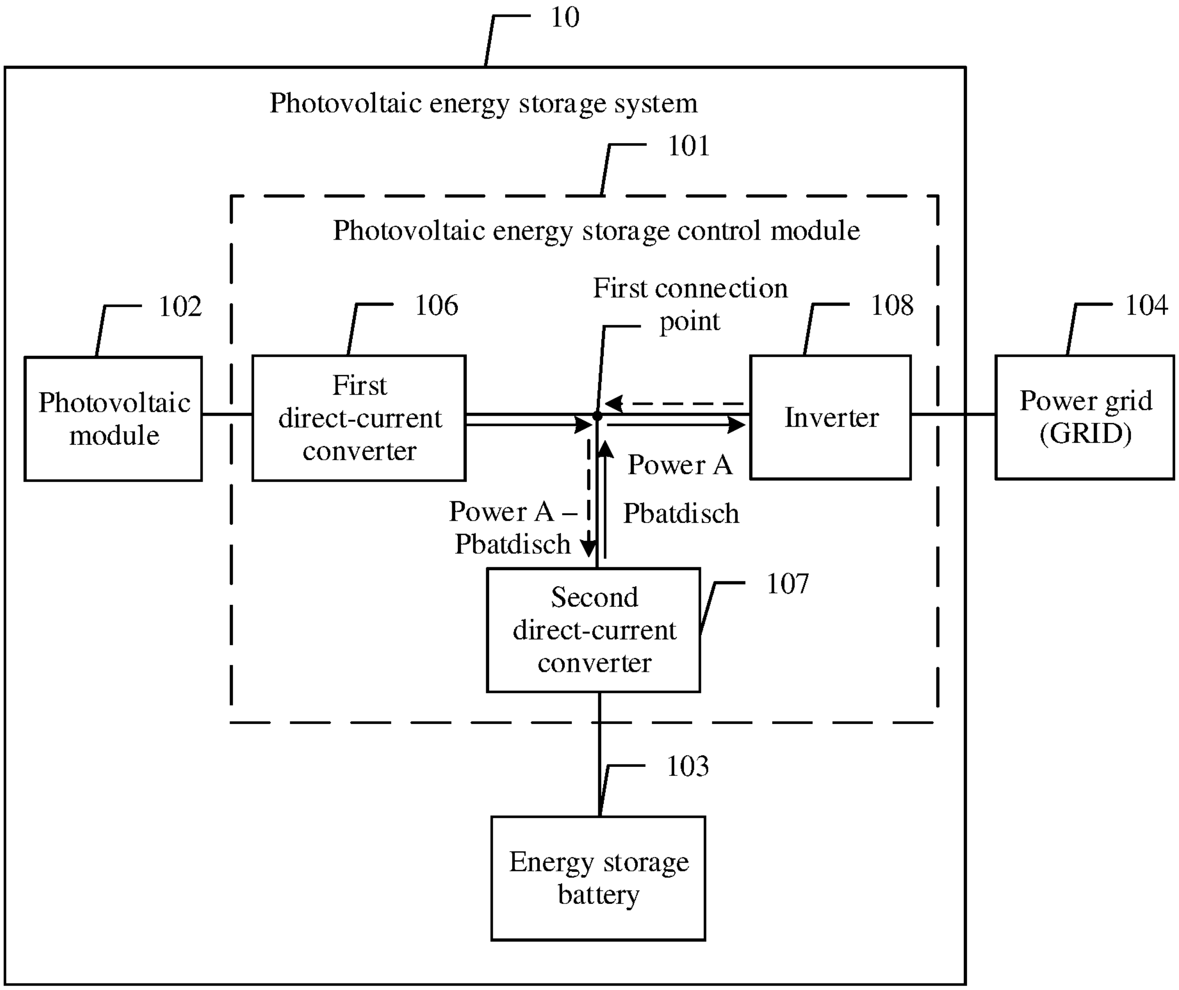
FIG. 8 is another schematic diagram of application of a photovoltaic energy storage control module according to this application.

FIG. 8 is a schematic diagram of application of a photovoltaic energy storage control module according to this application.

With reference to FIG. 8, in this case, power output by each of the first direct-current converter and the second direct-current converter is less than the scheduled power of the power grid, and cannot meet a requirement of the power grid. Therefore, the photovoltaic energy storage control module needs to preferentially output power to the inverter by using the second direct-current converter, and provide an insufficient power part by using the first direct-current converter. The bus voltage loop of the inverter is saturated, and fails in competing with the power loop. The inverter performs constant current control based on the scheduled power of the power grid, to control the photovoltaic energy storage control module to output the scheduled power of the power grid to the power grid. The bus voltage loop of the second direct-current converter is saturated, and fails in competing with the power loop. The second direct-current converter performs constant current control to output the maximum power (Pbatdisch). The bus voltage loop of the first direct-current converter works, and succeeds in competing with the power loop. The first direct-current converter controls the bus voltage to perform constant voltage control. A magnitude of the power output by the first direct-current converter is determined by the inverter and the second direct-current converter.

Case 3: Ppv>Power A >Pbatdisch.

In this case, a power output case is similar to that shown in FIG. 8. With reference to FIG. 8, the maximum power Pbatdisch output by the second direct-current converter is less than the scheduled power of the power grid, and cannot meet a requirement of the power grid. Therefore, the photovoltaic energy storage control module needs to output power to the inverter by jointly using the first direct-current converter and the second direct-current converter. The bus voltage loop of the inverter is saturated, and fails in competing with the power loop. The inverter performs constant current control to ensure that the photovoltaic energy storage control module outputs the scheduled power of the power grid. The bus voltage loop of the second direct-current converter is saturated, and fails in competing with the power loop. The second direct-current converter performs constant current control to output the maximum power Pbatdisch. The bus voltage loop of the first direct-current converter works, and succeeds in competing with the input voltage loop. The first direct-current converter controls the bus voltage to perform constant voltage control. A magnitude of the power output by the first direct-current converter is determined by the inverter and the second direct-current converter.

Case 4: Ppv>Pbatdisch >Power A.

Figure 9:
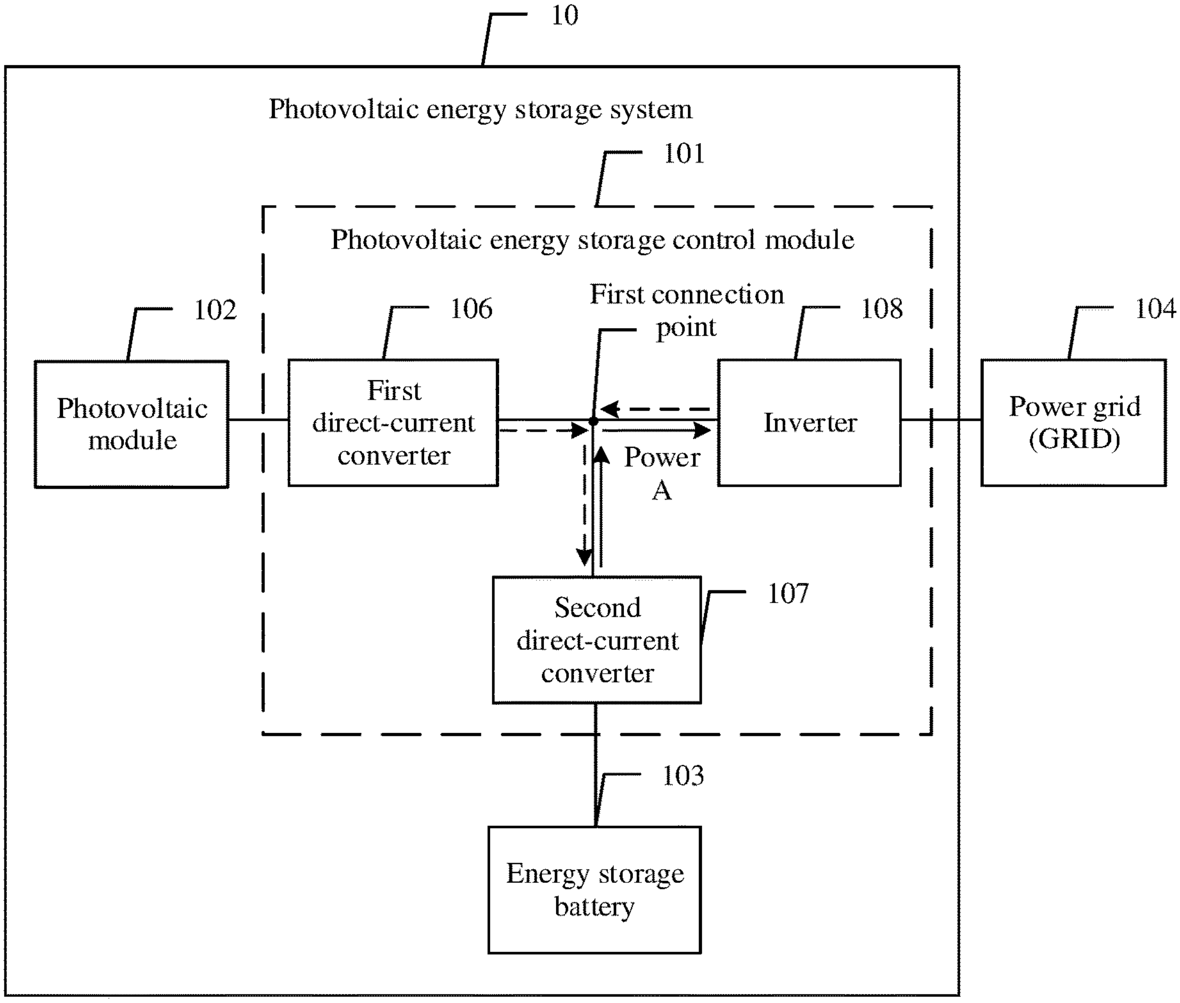
FIG. 9 is another schematic diagram of application of a photovoltaic energy storage control module according to this application.

FIG. 9 is a schematic diagram of application of a photovoltaic energy storage control module according to this application.

With reference to FIG. 9, in this case, the maximum power Pbatdisch output by the second direct-current converter is greater than the scheduled power of the power grid, and can meet a requirement of the power grid. Therefore, the photovoltaic energy storage control module needs to output power to the inverter by using the second direct-current converter, and the first direct-current converter does not need to output power. The bus voltage loop of the inverter is saturated, and fails in competing with the power loop. The inverter performs constant current control to ensure that the photovoltaic energy storage control module outputs the scheduled power of the power grid. The bus voltage of the second direct-current converter works, and succeeds in competing with the input voltage loop. The second direct-current converter controls the bus voltage to perform constant voltage control. A magnitude of the power output by the second direct-current converter is controlled by the inverter. The power output by the first direct-current converter is close to zero.

Case 5: Pbatdisch >Power A >Ppv.

In this case, a power output case is similar to that shown in FIG. 9. Refer to FIG. 9. The maximum power Pbatdisch output by the second direct-current converter is greater than the scheduled power of the power grid, and can meet a requirement of the power grid. Therefore, the photovoltaic energy storage control module needs to output power to the inverter by using the second direct-current converter, and the first direct-current converter does not need to output power. The bus voltage loop of the inverter is saturated, and fails in competing with the power loop. The inverter performs constant current control to ensure that the photovoltaic energy storage control module outputs the scheduled power of the power grid. The bus voltage of the second direct-current converter works, and succeeds in competing with the input voltage loop. The second direct-current converter controls the bus voltage to perform constant voltage control. A magnitude of the power output by the second direct-current converter is controlled by the inverter. The power output by the first direct-current converter is close to zero.

The foregoing embodiment describes a plurality of different cases included in Scenario 2 in which the second direct-current converter preferentially outputs power to the inverter. Optionally, the first direct-current converter and the inverter may further output power to the second direct-current converter, to charge the energy storage battery through the second direct-current converter. The following describes a plurality of different cases included in Scenario 3 in which the first direct-current converter preferentially outputs power to the second direct-current converter.

Scenario 3: The first direct-current converter preferentially outputs power to the second direct-current converter.

In this application, optionally, the control component may set a reference value of a bus voltage of the first direct-current converter to a seventh value, set a reference value of a bus voltage of the second direct-current converter to an eighth value, and set a reference value of a bus voltage of the inverter to a ninth value. The seventh value is greater than the ninth value, and the ninth value is greater than the eighth value.

The first direct-current converter, the second direct-current converter, and the inverter may adjust, based on the fact that the seventh value is greater than the ninth value and the ninth value is greater than the eighth value, the first direct-current converter to preferentially output power to the second direct-current converter than the inverter.

In this application, it is assumed that Ppv is maximum photovoltaic discharging power, that is, maximum power output by the first direct-current converter to the first connection point; Pbatch is maximum charging power allowed by the battery, that is, maximum power input to the second direct-current converter; Pbatdisch is maximum discharging power of the battery, that is, maximum power output by the second direct-current converter to the first connection point; Pinvch is charging power output by the inverter from the power grid, and Pinvdisch is discharging power of a photovoltaic energy storage control system to the power grid; and Power A is the scheduled power of the power grid.

In this application, when charging the energy storage battery, the first direct-current converter and the inverter output power to the second direct-current converter, to charge the energy storage battery through the second direct-current converter. The first direct-current converter preferentially outputs power to the second direct-current converter than the inverter (that is, the first direct-current converter preferentially discharges, and the inverter supplementally discharges when energy of the first direct-current converter is insufficient). In this scenario, the reference value of the bus voltage loop of the first direct-current converter>the reference value of the bus voltage loop of the inverter >the reference value of the bus voltage loop of the second direct-current converter. This scenario further includes a plurality of different cases. The following separately describes these different cases.

Case 1: Pbatch >Ppv.

Figure 10:
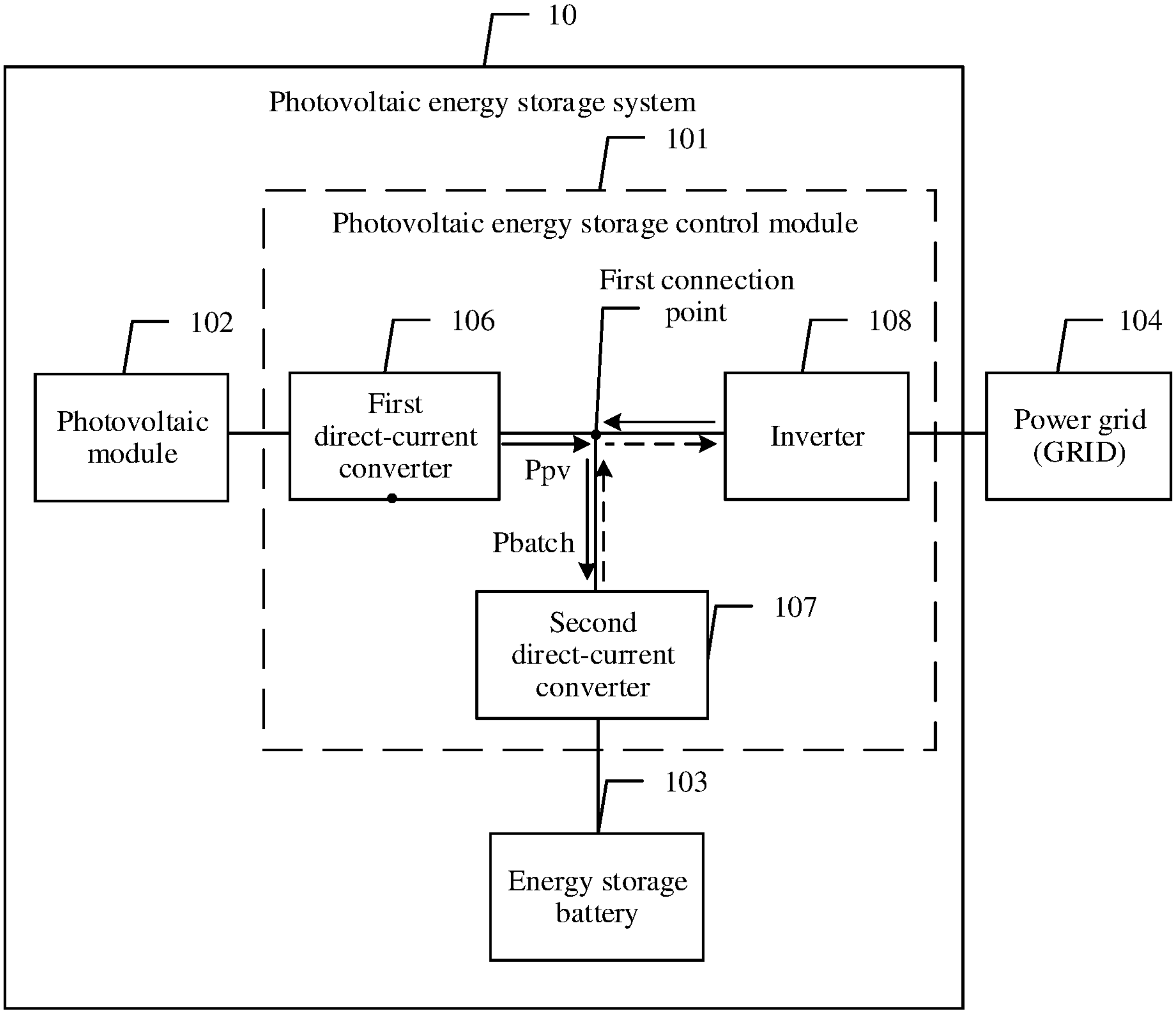
FIG. 10 is another schematic diagram of application of a photovoltaic energy storage control module according to this application.

FIG. 10 is a schematic diagram of application of a photovoltaic energy storage control module according to this application.

With reference to FIG. 10, in this case, the maximum power Ppv output by the first direct-current converter is less than maximum charging power of the second direct-current converter, and cannot meet a fast charging requirement of the energy storage battery. Therefore, the photovoltaic energy storage control module needs to output power to the second direct-current converter by jointly using the first direct-current converter and the inverter. The bus voltage loop of the first direct-current converter is saturated, and fails in competing with the input voltage loop. The first direct-current converter works at the first direct-current converter point, and performs constant current control to output the maximum power Ppv to the second direct-current converter, to charge the battery at the maximum output power. If the allowed charging power Pinvch of the inverter is greater than (Pbatch—Ppv), the second direct-current converter performs constant current control on charging at the maximum allowed power Pbatch. The bus voltage loop of the inverter works. The inverter controls the bus voltage to perform constant voltage control. The power output by the inverter is determined by the second direct-current converter. If the charge power Pinvch from the inverter is less than (Pbatch—Ppv), the bus voltage loop of the second direct-current converter succeeds in competition, and the second direct-current converter performs constant voltage control on a bus. The bus voltage loop of the inverter fails in competition. The inverter performs constant current control. The inverter outputs maximum allowed charging power to the second direct-current converter, and charges the energy storage battery at the maximum allowed charging power.

Case 2: Pbatch<Ppv.

Figure 11:
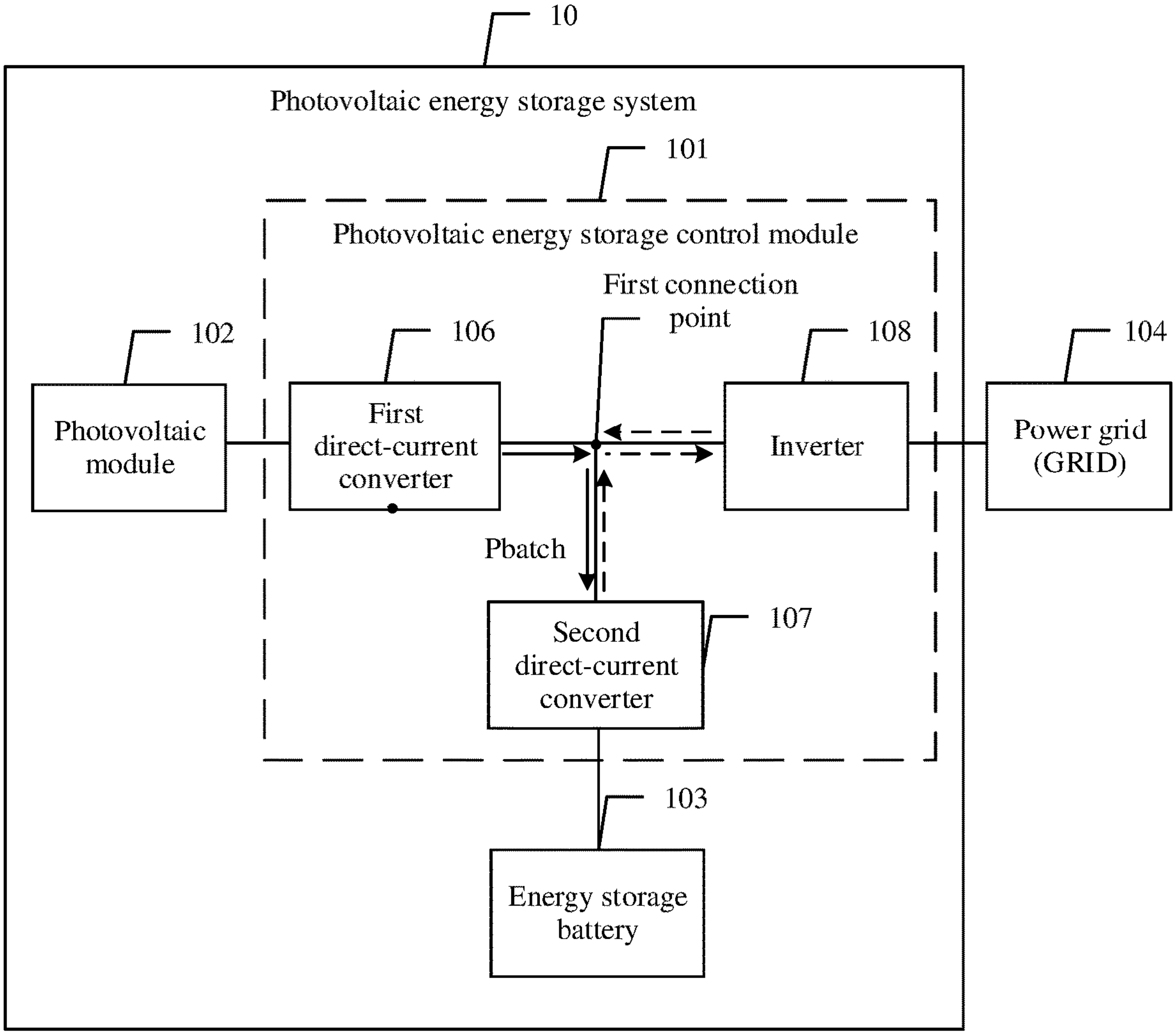
FIG. 11 is another schematic diagram of application of a photovoltaic energy storage control module according to this application.

FIG. 11 is a schematic diagram of application of a photovoltaic energy storage control module according to this application.

With to FIG. 11, in this case, the maximum power Ppv output by the first direct-current converter is greater than the maximum charging power Pbatch of the second direct-current converter, and can meet a fast charging requirement of the energy storage battery. Therefore, the photovoltaic energy storage control module needs to output power to the second direct-current converter by using the first direct-current converter, and the inverter does not need to output power. The bus voltage loop of the first direct-current converter succeeds in competing with the input voltage loop. The first direct-current converter controls the bus voltage to perform constant voltage control in the photovoltaic energy storage control module. A magnitude of the power output by the first direct-current converter is controlled by the second direct-current converter. The second direct-current converter performs constant current control, to charge the energy storage battery at the maximum allowed charging power Pbatch. Optionally, remaining energy of the first direct-current converter may further discharge to the power grid through the inverter, and the inverter performs constant current control, to control a magnitude of power at which the first direct-current converter charges the power grid.

In this application, with reference to a plurality of cases in the foregoing three scenarios, a process in which the first direct-current converter, the second direct-current converter, and the inverter perform automatic control is described. When a direct-current bus voltage is within a bus voltage control range of the first direct-current converter, the first direct-current converter automatically switches to constant voltage control to perform bus voltage control, and the inverter and the second direct-current converter automatically switch to constant current control to perform power control. When a bus voltage is within a bus control range of the second direct-current converter, the second direct-current converter automatically switches to constant voltage control to perform bus voltage control, and the first direct-current converter and the inverter automatically switch to constant current control to perform power control. When a bus voltage is within a bus control range of the inverter, the inverter automatically switches to constant voltage control to perform bus voltage control, and the first direct-current converter and the second direct-current converter automatically switch to constant current control to perform power control.

In this application, a structure of the photovoltaic energy storage control module in the embodiments described in Scenario 1 to Scenario 3 is described by using the structure shown in FIG. 2 as an example. Optionally, the structure of the photovoltaic energy storage control module mentioned in Scenario 1 to Scenario 3 may also be a structure shown in FIG. 3. This is not specifically limited herein.

In this application, the control component can implement the functions in the foregoing examples, and the control component may further receive a first instruction. The first instruction indicates the value relationship among the reference values of the bus voltages of the first direct-current converter, the second direct-current converter, and the inverter. Optionally, the first instruction may indicate that the reference value of the bus voltage loop of the first direct-current converter>the reference value of the bus voltage loop of the second direct-current converter>the reference value of the bus voltage loop of the inverter. Optionally, the first instruction may indicate that the reference value of the bus voltage loop of the second direct-current converter>the reference value of the bus voltage loop of the first direct-current converter>the reference value of the bus voltage loop of the inverter. Optionally, the first instruction may further indicate that the reference value of the bus voltage loop of the first direct-current converter>the reference value of the bus voltage loop of the inverter >the reference value of the bus voltage loop of the second direct-current converter. This is not specifically limited herein. The control component may further set the reference values of the bus voltages of the first direct-current converter, the second direct-current converter, and the inverter according to the first instruction.

The foregoing embodiment describes a plurality of different cases included in Scenario 3 in which the first direct-current converter preferentially outputs power to the second direct-current converter. In this application, there is a specific implementation in which the control component sets the reference values of the bus voltage loops of the first direct-current converter, the second direct-current converter, and the inverter according to a target instruction. The implementation is described in the following example.

In this application, the first direct-current converter, the second direct-current converter, and the inverter may calculate the bus reference voltages for respectively meeting working requirements of the first direct-current converter, the second direct-current converter, and the inverter. A first voltage may be obtained through calculation based on a voltage that is input by the photovoltaic module to the first direct-current converter. A second voltage may be obtained through calculation based on an input voltage of the energy storage battery. A third voltage may be obtained through calculation based on a current voltage of the power grid. The control component determines a fourth voltage. The fourth voltage and a tenth value are added to obtain the reference value of the bus voltage of the first direct-current converter. The fourth voltage and an eleventh value are added to obtain the reference value of the bus voltage of the second direct-current converter. The fourth voltage and a twelfth value are added to obtain the reference value of the bus voltage of the inverter. A value relationship among the bus voltages of the first direct-current converter, the second direct-current converter, and the inverter is adjusted by adjusting a value relationship among the tenth value, the eleventh value, and the twelfth value. This possible implementation provides a specific implementation of calculating a bus reference voltage, to improve implementability of the solution.

In this application, the control component included in the photovoltaic energy storage control module may set the reference values of the bus voltages of the first direct-current converter, the second direct-current converter, and the inverter. Further, because the reference values of the bus voltages of the first direct-current converter, the second direct-current converter, and the inverter are different, when scheduled power of the power grid changes, one of the first direct-current converter, the second direct-current converter, and the inverter controls the bus voltage to perform constant voltage control, and the other two devices perform constant current control to control power. The constant voltage control and the constant current control may be automatically switched. The first direct-current converter, the second direct-current converter, and the inverter may automatically adjust, based on the value relationship among the reference values of the bus voltages, values of power output by the first direct-current converter and the second direct-current converter to the inverter, to ensure that the photovoltaic energy storage control module can output smooth and stable power to the power grid. In addition, priorities of outputting power by the first direct-current converter and the second direct-current converter to the inverter are adjusted based on the value relationship among the reference values of the bus voltages of the first direct-current converter and the second direct-current converter. When the first direct-current converter has a higher output priority, the first direct-current converter preferentially outputs power to the inverter, and the second direct-current converter supplementally outputs power. When the second direct-current converter has a higher output priority, the second direct-current converter preferentially outputs power to the inverter, and the first direct-current converter supplementally outputs power to the inverter. This further improves flexibility of outputting power by the photovoltaic energy storage control module to the power grid.

In this application, the specific implementation and the beneficial effects of the photovoltaic energy storage control method are similar to the specific implementation and the beneficial effects of the photovoltaic energy storage module provided in the foregoing examples. For details, refer to the embodiments of the photovoltaic energy storage control module in the foregoing embodiments. Details are not described herein again.

The foregoing describes in detail the photovoltaic energy storage system, the photovoltaic energy storage control module, and the photovoltaic energy storage control method provided in this application. This specification describes a principle and an implementation of this application by using specific examples. Description of the foregoing embodiments is merely used to help understand the method and the core idea of this application. In addition, a person of ordinary skill in the art makes variations to the specific implementations and the application scope based on the idea of this application. Therefore, the content of this specification shall not be construed as a limitation on this application.

What is claimed is:

1. A photovoltaic energy storage control module, comprising;

a first direct-current converter;

a second direct-current converter;

an inverter; and a control circuit, a first end of the first direct-current converter being electrically connected to a first end of the second direct-current converter and a first end of the inverter through a first connection point, wherein a second end of the first direct-current converter is configured to be electrically connected to a photovoltaic circuit; and wherein the first end of the second direct-current converter is electrically connected to the first end of the inverter through the first connection point, and a second end of the second direct-current converter is configured to be electrically connected to an energy storage battery, and wherein a second end of the inverter is configured to be electrically connected to a power grid; and wherein the control circuit is configured to set reference values of bus voltages of the first direct-current converter, the second direct-current converter, and the inverter; and wherein the first direct-current converter, the second direct-current converter, and the inverter are jointly configured to adjust a power supply relationship among the first direct-current converter, the second direct-current converter, and the inverter based on a value relationship among the reference values of the bus voltages of the first direct-current converter, the second direct-current converter, and the inverter; and wherein when a reference value of a bus voltage of the first direct-current converter is greater than a reference value of a bus voltage of the second direct-current converter, and the reference value of the bus voltage of the second direct-current converter is greater than a reference value of a bus voltage of the inverter; and when maximum output power of the first direct-current converter is greater than scheduled power of the power grid, and the scheduled power of the power grid is greater than maximum output power of the second direct-current converter, the photovoltaic energy storage control module is configured to control the inverter to perform constant current control, control one of the first direct-current converter and the second direct-current converter to perform constant current control, and control the other one of the first direct-current converter and the second direct-current converter to perform constant voltage control.

2. The photovoltaic energy storage control module according to claim 1, wherein the control circuit is configured to: set a reference value of a bus voltage of the first direct-current converter to a fourth value, set a reference value of a bus voltage of the second direct-current converter to a fifth value, and set a reference value of a bus voltage of the inverter to a sixth value, wherein the fifth value is greater than the fourth value, and the fourth value is greater than the sixth value; and the first direct-current converter, the second direct-current converter, and the inverter are jointly configured to adjust, based on the fifth value being set to be greater than the fourth value and the fourth value being set to be greater than the sixth value, the second direct-current converter to preferentially output power to the inverter than the first direct-current converter.

3. The photovoltaic energy storage control module according to claim 1, wherein the first direct-current converter is further configured to calculate a first voltage, wherein the first voltage indicates a reference bus voltage required for normal operating of the first direct-current converter;

the second direct-current converter is further configured to calculate a second voltage, wherein the second voltage indicates a reference bus voltage required for normal operating of the second direct-current converter;

the inverter is further configured to calculate a third voltage, wherein the third voltage indicates a reference bus voltage required for normal operating of the inverter; and the control circuit is further configured to: determine a fourth voltage, wherein the fourth voltage is a largest value of the first voltage, the second voltage, and the third voltage; and add a tenth value, an eleventh value, and a twelfth value to the fourth voltage to obtain the reference values of the bus voltages of the first direct-current converter, the second direct-current converter, and the inverter.

4. The photovoltaic energy storage control module according to claim 1, wherein the control circuit is further configured to receive a first instruction, wherein the first instruction indicates the value relationship among the reference values of the bus voltages of the first direct-current converter, the second direct-current converter, and the inverter; and the control circuit is configured to set the reference values of the bus voltages of the first direct-current converter, the second direct-current converter, and the inverter according to the first instruction.

5. The photovoltaic energy storage control module according to claim 1, wherein the control circuit comprises the first direct-current converter, the second direct-current converter, or the inverter.

6. The photovoltaic energy storage control module according to claim 1, wherein the control circuit is a device independent of the first direct-current converter, the second direct-current converter, and the inverter; and wherein the control circuit is electrically connected to the first direct-current converter, the second direct-current converter, and the inverter through the first connection point.

7. The photovoltaic energy storage control module according to claim 1, wherein when a reference value of a bus voltage of the first direct-current converter is greater than a reference value of a bus voltage of the inverter, and the reference value of the bus voltage of the inverter is greater than a reference value of a bus voltage of the second direct-current converter; and when maximum output power of the second direct-current converter is less than maximum output power of the first direct-current converter, the photovoltaic energy storage control module is configured to control the first direct-current converter to perform constant voltage control, control the second direct-current converter to perform constant current control, and control the inverter to perform constant current control.

8. A photovoltaic energy storage control method, applied to a photovoltaic energy storage control circuit, wherein the photovoltaic energy storage control circuit comprises a control circuit, a first direct-current converter, a second direct-current converter, and an inverter, a first end of the first direct-current converter is electrically connected to a first end of the second direct-current converter and a first end of the inverter through a first connection point, a second end of the first direct-current converter is electrically connected to a photovoltaic circuit, a first end of the second direct-current converter is electrically connected to the first end of the inverter through the first connection point, a second end of the second direct-current converter is electrically connected to an energy storage battery, a second end of the inverter is electrically connected to a power grid, and the method comprising:

setting, by the control circuit, reference values of bus voltages of the first direct-current converter, the second direct-current converter, and the inverter; and adjusting a power supply relationship among the first direct-current converter, the second direct-current converter, and the inverter based on a value relationship among the reference values of the bus voltages of the first direct-current converter, the second direct-current converter, and the inverter; and when a reference value of a bus voltage of the first direct-current converter is greater than a reference value of a bus voltage of the second direct-current converter, and the reference value of the bus voltage of the second direct-current converter is greater than a reference value of a bus voltage of the inverter; and when maximum output power of the first direct-current converter is greater than scheduled power of the power grid, and the scheduled power of the power grid is greater than maximum output power of the second direct-current converter, controlling the inverter to perform constant current control, controlling one of the first direct-current converter and the second direct-current converter to perform constant current control, and controlling the other one of the first direct-current converter and the second direct-current converter to perform constant voltage control; or when a reference value of a bus voltage of the first direct-current converter is greater than a reference value of a bus voltage of the inverter, and the reference value of the bus voltage of the inverter is greater than a reference value of a bus voltage of the second direct-current converter; and when maximum output power of the second direct-current converter is less than maximum output power of the first direct-current converter, controlling the first direct-current converter to perform constant voltage control, controlling the second direct-current converter to perform constant current control, and controlling the inverter to perform constant current control.

9. The photovoltaic energy storage control method according to claim 8, wherein the setting, by the control circuit, reference values of bus voltages of the first direct-current converter, the second direct-current converter, and the inverter comprises:

setting, by the control circuit, a reference value of a bus voltage of the first direct-current converter to a fourth value, setting a reference value of a bus voltage of the second direct-current converter to a fifth value, and setting a reference value of a bus voltage of the inverter to a sixth value, wherein the fifth value is greater than the fourth value, and the fourth value is greater than the sixth value; and wherein the adjusting a power supply relationship among the first direct-current converter, the second direct-current converter, and the inverter based on a value relationship among the reference values of the bus voltages of the first direct-current converter, the second direct-current converter, and the inverter comprises:

adjusting, based on the fifth value being set to be greater than the fourth value and the fourth value being set to be greater than the sixth value, the first direct-current converter to preferentially output power to the inverter than the second direct-current converter.

10. The photovoltaic energy storage control method according to claim 8, wherein the method further comprises:

calculating, by the first direct-current converter, a first voltage, wherein the first voltage indicates a reference bus voltage required for normal operating of the first direct-current converter;

calculating, by the second direct-current converter, a second voltage, wherein the second voltage indicates a reference bus voltage required for normal operating of the second direct-current converter;

calculating, by the inverter, a third voltage, wherein the third voltage indicates a reference bus voltage required for normal operating of the inverter; and determining, by the control circuit, a fourth voltage, wherein the fourth voltage is a largest value of the first voltage, the second voltage, and the third voltage; and adding a tenth value, an eleventh value, and a twelfth value to the fourth voltage to obtain the reference values of the bus voltages of the first direct-current converter, the second direct-current converter, and the inverter.

11. The photovoltaic energy storage control method according to claim 8, wherein the method further comprises:

receiving, by the control circuit, a first instruction, wherein the first instruction indicates a value relationship among the reference values of the bus voltages of the first direct-current converter, the second direct-current converter, and the inverter; and setting, by the control circuit, the reference values of the bus voltages of the first direct-current converter, the second direct-current converter, and the inverter according to the first instruction.

12. The photovoltaic energy storage control method according to claim 8, wherein the control circuit comprises the first direct-current converter, the second direct-current converter, or the inverter.

13. The photovoltaic energy storage control method according to claim 8, wherein the control circuit is a device independent of the first direct-current converter, the second direct-current converter, and the inverter; and the control circuit is electrically connected to the first direct-current converter, the second direct-current converter, and the inverter through the first connection point.

14. A photovoltaic energy storage system comprising:

a photovoltaic energy storage control module, the photovoltaic energy storage control module comprising a first direct-current converter, a second direct-current converter, an inverter, and a control circuit, wherein a first end of the first direct-current converter is electrically connected to a first end of the second direct-current converter and a first end of the inverter through a first connection point, wherein a second end of the first direct-current converter is configured to be electrically connected to a photovoltaic circuit; and wherein the first end of the second direct-current converter is electrically connected to the first end of the inverter through the first connection point, and a second end of the second direct-current converter is configured to be electrically connected to an energy storage battery, and wherein a second end of the inverter is configured to be electrically connected to a power grid; and wherein the control circuit is configured to set reference values of bus voltages of the first direct-current converter, the second direct-current converter, and the inverter; and wherein the first direct-current converter, the second direct-current converter, and the inverter are jointly configured to adjust a power supply relationship among the first direct-current converter, the second direct-current converter, and the inverter based on a value relationship among the reference values of the bus voltages of the first direct-current converter, the second direct-current converter, and the inverter; and wherein when a reference value of a bus voltage of the first direct-current converter is greater than a reference value of a bus voltage of the inverter, and the reference value of the bus voltage of the inverter is greater than a reference value of a bus voltage of the second direct-current converter; and when maximum output power of the second direct-current converter is less than maximum output power of the first direct-current converter, the photovoltaic energy storage control module is configured to control the first direct-current converter to perform constant voltage control, control the second direct-current converter to perform constant current control, and control the inverter to perform constant current control.

15. The system of claim 14, further comprising:

the photovoltaic circuit;

the photovoltaic energy storage control module; and the energy storage battery, the photovoltaic energy storage control module being electrically connected to the photovoltaic circuit, the energy storage battery, and a power grid.

16. The system of claim 14, wherein the control circuit is configured to: set a reference value of a bus voltage of the first direct-current converter to a fourth value, set a reference value of a bus voltage of the second direct-current converter to a fifth value, and set a reference value of a bus voltage of the inverter to a sixth value, wherein the fifth value is greater than the fourth value, and the fourth value is greater than the sixth value; and the first direct-current converter, the second direct-current converter, and the inverter are jointly configured to adjust, based on the fifth value being set to be greater than the fourth value and the fourth value being set to be greater than the sixth value, the second direct-current converter to preferentially output power to the inverter than the first direct-current converter.

17. The system of claim 14, wherein the first direct-current converter is further configured to calculate a first voltage, wherein the first voltage indicates a reference bus voltage required for normal operating of the first direct-current converter;

the second direct-current converter is further configured to calculate a second voltage, wherein the second voltage indicates a reference bus voltage required for normal operating of the second direct-current converter;

the inverter is further configured to calculate a third voltage, wherein the third voltage indicates a reference bus voltage required for normal operating of the inverter; and the control circuit is further configured to: determine a fourth voltage, wherein the fourth voltage is a largest value of the first voltage, the second voltage, and the third voltage; and add a tenth value, an eleventh value, and a twelfth value to the fourth voltage to obtain the reference values of the bus voltages of the first direct-current converter, the second direct-current converter, and the inverter.

18. The system of claim 14, wherein the control circuit is further configured to receive a first instruction, wherein the first instruction indicates the value relationship among the reference values of the bus voltages of the first direct-current converter, the second direct-current converter, and the inverter; and the control circuit is configured to set the reference values of the bus voltages of the first direct-current converter, the second direct-current converter, and the inverter according to the first instruction.

19. The system of claim 14, wherein the control circuit comprises the first direct-current converter, the second direct-current converter, or the inverter.

20. The system of claim 14, wherein the control circuit is a device independent of the first direct-current converter, the second direct-current converter, and the inverter; and wherein the control circuit is electrically connected to the first direct-current converter, the second direct-current converter, and the inverter through the first connection point.

* * * * *